US012529896B2

(12) United States Patent
Park et al.

(10) Patent No.: US 12,529,896 B2
(45) Date of Patent: Jan. 20, 2026

(54) DEVICE FOR PROVIDING AUGMENTED REALITY CONTENTS

(71) Applicant: Samsung Display Co., LTD., Yongin-si (KR)

(72) Inventors: Sung Kook Park, Suwon-si (KR); Young Seok Seo, Seoul (KR); Sung Eun Baek, Suwon-si (KR); Tae Hee Lee, Hwaseong-si (KR); Jin Woo Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 658 days.

(21) Appl. No.: 17/872,315

(22) Filed: Jul. 25, 2022

(65) Prior Publication Data
US 2023/0152584 A1  May 18, 2023

(30) Foreign Application Priority Data
Nov. 16, 2021  (KR) ........................ 10-2021-0157901

(51) Int. Cl.
*G02B 27/01* (2006.01)
*G06F 3/042* (2006.01)
*G06T 19/00* (2011.01)

(52) U.S. Cl.
CPC ....... *G02B 27/0172* (2013.01); *G06F 3/0421* (2013.01); *G06T 19/006* (2013.01)

(58) Field of Classification Search
None
See application file for complete search history.

(56) References Cited

U.S. PATENT DOCUMENTS

| 8,217,856 | B1 | 7/2012 | Petrou |
| 9,952,433 | B2 | 4/2018 | Um et al. |
| 2015/0198810 | A1* | 7/2015 | Lee .................... G02B 27/0172 |
| | | | 359/633 |
| 2021/0376020 | A1* | 12/2021 | Ahn ................... H10K 50/8428 |

FOREIGN PATENT DOCUMENTS

| JP | 2010-128653 | 6/2010 |
| KR | 10-2014-0026898 | 3/2014 |
| KR | 10-1385263 | 4/2014 |
| KR | 1020150026336 A | 3/2015 |
| KR | 10-2015-0084510 | 7/2015 |

* cited by examiner

*Primary Examiner* — Bao-Luan Q Le
*Assistant Examiner* — Danell L Owens
(74) *Attorney, Agent, or Firm* — CANTOR COLBURN LLP

(57) ABSTRACT

A display device for providing includes a display part outputting display light for displaying an image, an optical part forming a path of the display light so that the image is displayed on a transparent lens, and sensing a change in the amount of light according to a user's touch on the path of the display light outputting light amount detection signals, and a controller analyzing changes in the magnitude of the light amount detection signals to sense the user's touch, and activating a user interface function based on sensing results.

21 Claims, 21 Drawing Sheets

DEVICE FOR PROVIDING AUGMENTED REALITY CONTENTS

CROSS-REFERENCE TO RELATED APPLICATION(S)

This application claims priority to and benefits of Korean Patent Application No. 10-2021-0157901 under 35 U.S.C. 119, filed on Nov. 16, 2021 in the Korean Intellectual Property Office (KIPO), the entire contents of which are herein incorporated by reference.

BACKGROUND

1. Technical Field

The disclosure relates to a device for providing augmented reality contents.

2. Description of the Related Art

Recently, as electronic devices and display devices capable of realizing virtual reality (VR) have been developed, such devices are attracting more and more attention. As the next step of virtual reality, a technology capable of realizing augmented reality (AR) and mixed reality (MR) is being studied.

Unlike the virtual reality that creates a completely virtual world, augmented reality is a display technology that further increases the effect of reality by superimposing virtual objects or image information over the environment of the real world.

While applications of virtual reality have been limited only to fields such as games and virtual experiences, augmented reality advantageously finds a variety of applications that can be applied to the real environment in various ways. In particular, augmented reality is attracting attention as a next-generation display technology suitable for a ubiquitous environment or an Internet of Things (IoT) environment. Such augmented reality can be said to be an example of mixed reality in that it mixes and shows the real world and additional information of the virtual world.

SUMMARY

Aspects of the disclosure provide a display device for providing augmented reality contents that can sense a user's touch using display light of a display part that displays an augmented reality contents image, and that can activate a user interface function.

Aspects of the disclosure also provide a display device for providing augmented reality contents that can display a touch sensing state on an augmented reality contents image in real time to prevent a touch sensing error and an interface malfunction.

It should be noted that aspects of the disclosure are not limited to the above-mentioned aspects; and other aspects of the disclosure will be apparent to those skilled in the art from the following descriptions.

According to an embodiment of the disclosure, a display device may include a display part that outputs display light for displaying an image, an optical part that forms a path of the display light so that the image may be displayed on a transparent lens, and senses a change in an amount of light on the path of the display light caused by a user's touch to output light amount detection signals, and a controller that analyzes changes in magnitudes of the light amount detection signals to sense the user's touch, and activates a user interface function based on sensing results.

In an embodiment, the optical part may include a first reflective member that reflects the display light for the image displayed in the display part to supply the display light to the transparent lens, and a rear surface or an exterior of the first reflective member may be used as a touch surface to generate and output the light amount detection signal so that the light amount detection signal corresponds to the amount of light in vicinity that varies according to the user's touch.

In an embodiment, the first reflective member may include a plurality of first light-receiving sensing parts that generate the light amount detection signal having magnitude varying according to a change in the amount of light incident from the display part and a change in the amount of light in the vicinity to output the light amount detection signal.

In an embodiment, the first light-receiving sensing parts may be disposed on a reflective surface of the first reflective member and may be disposed at part of border areas of the reflective surface comprising corners of the reflective surface.

In an embodiment, each of the plurality of first light-receiving sensing parts may include a groove having a depth and formed in the reflective surface of the first reflective member, and at least one light-receiving sensor disposed in the groove such that the at least one light receiving sensor faces a front side of the reflective surface, and the at least one light-receiving sensor may supply the light amount detection signal having a magnitude varying according to a change in the amount of light in vicinity and a change in the amount of incident light to the controller.

In an embodiment, the reflective surface of the first reflective member that reflects the display light may be divided into regions of n×m blocks, n and m being natural numbers equal to or greater than two, and the first light-receiving sensing parts may be formed at corners or some of border areas of the regions of the n×m blocks.

In an embodiment, the controller controls driving of the display part so that the sensing results on the user's touch may be displayed on the image, and the controller controls an image display operation of the display part and a sensing operation of the sensing module pursuant to the user's touch as the user interface function may be activated.

In an embodiment, the controller may compare an average value of the light amount detection signals with a magnitude value of each of the light amount detection signals at least at every frame, select out at least one first light-receiving sensing part that outputs a light amount detection signal of a lower magnitude value than the average value of the light amount detection signals by a reference difference value, and determine that the user's touch may be made in vicinity of the selected at least one first light-receiving sensing part and modulate data for displaying the image.

In an embodiment, the optical part may include a first reflective member that reflects the display light for the image displayed in the display part, and a second reflective member that reflects again the display light reflected from the first reflective member to supply the display light to the transparent lens, and a rear surface or an exterior of the second reflective member may be used as a touch surface to generate and output the light amount detection signal so that the light amount detection signal corresponds to the amount of light in vicinity that varies according to the user's touch.

In an embodiment, the second reflective member may include a plurality of second light-receiving sensing parts that generate the light amount detection signal having magnitude varying according to a change in the amount of light incident from the display part and a change in the amount of light in the vicinity to output the light amount detection signal.

In an embodiment, the second light-receiving sensing parts may be disposed on a reflective surface of the second reflective member and may be disposed at part of border areas of the reflective surface comprising corners of the reflective surface.

In an embodiment, each of the plurality of second light-receiving sensing parts may include a groove having a depth and formed in the reflective surface of the second reflective member, and at least one light-receiving sensor disposed in the groove such that the at least one light-receiving sensor faces a front side of the reflective surface, and the at least one light-receiving sensor may supply the light amount detection signal having a magnitude varying according to a change in the amount of light in vicinity and a change in the amount of incident light to the controller.

In an embodiment, the reflective surface of the second reflective member that reflects the display light may be divided into regions of n×m blocks, n and m being natural numbers equal to or greater than two, and the second light-receiving sensing parts may be formed at corners or part of border areas of the regions of the n×m blocks.

In an embodiment, the controller may control driving of the display part so that the sensing results on the user's touch may be displayed on the augmented reality content image, and may control an image display operation of the display part and a sensing operation of the sensing module pursuant to the user's touch as the user interface function may be activated.

In an embodiment, the display part may be assembled on a side or two sides of a support frame for supporting the transparent lens or integral with the support frame, and the display part may display the augmented reality content image using at least one image displayer.

In an embodiment, the at least one image displayer may include a bank partitioned and arranged in a Pentile™ matrix on a substrate, light-emitting elements respectively disposed in emission areas arranged in the Pentile™ matrix by partitions of the bank and extended in a thickness direction of the substrate, a base resin formed in the emission areas comprising the light-emitting elements, and optical patterns selectively disposed on at least one of the emission areas.

In an embodiment, the emission areas may be formed such that first to third emission areas or first to fourth emission areas may be arranged in the Pentile™ matrix in each pixel area.

In an embodiment, the first emission area may include a first light-emitting element that emits a first light having a wavelength range producing one of red, green and blue colors, the second emission area may include a second light-emitting element that emits a second light having a wavelength range producing one of red, green and blue colors which may be different from the first light, the third emission area includes a third light-emitting element that emits a third light having a wavelength range producing one of red, green and blue colors which may be different from the first light and the second light, and the fourth emission area includes a fourth light-emitting element that emits a fourth light, the fourth light and one of the first to third lights having a same wavelength range.

In an embodiment, the first to fourth emission areas may have a same size or area when viewed in a plan view, and a distance between the first emission area and the second emission area, a distance between the second emission area and the third emission area, and a distance between the first emission area and the third emission area, and a distance between the third emission area and the fourth emission area, which may be adjacent to each other in a horizontal or diagonal direction, may be equal depending on the size or area of each of the first to fourth emission areas.

In an embodiment, the first to fourth emission areas may selectively have different sizes or areas when viewed from in a plan view, and a distance between the first emission area and the second emission area, a distance between the second emission area and the third emission area, and a distance between the first emission area and the third emission area, and a distance between the third emission area and the fourth emission area may be equal or different depending on the size or area of each of the first to fourth emission areas.

According to an embodiment of the disclosure, a user's touch can be sensed by using display light for displaying an augmented reality contents image in a display device for providing augmented reality contents, so that it may be possible to activate a user interface function with a simpler and more efficient structure.

The display device for providing augmented reality contents can allow a touch sensing state on a path of display light for the augmented reality contents image to be displayed on the augmented reality contents image in real time. Accordingly, it may be possible to prevent a touch sensing error and an interface malfunction, and to improve user reliability.

It should be noted that effects of the disclosure are not limited to those described above and other effects of the disclosure will be apparent to those skilled in the art from the following description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
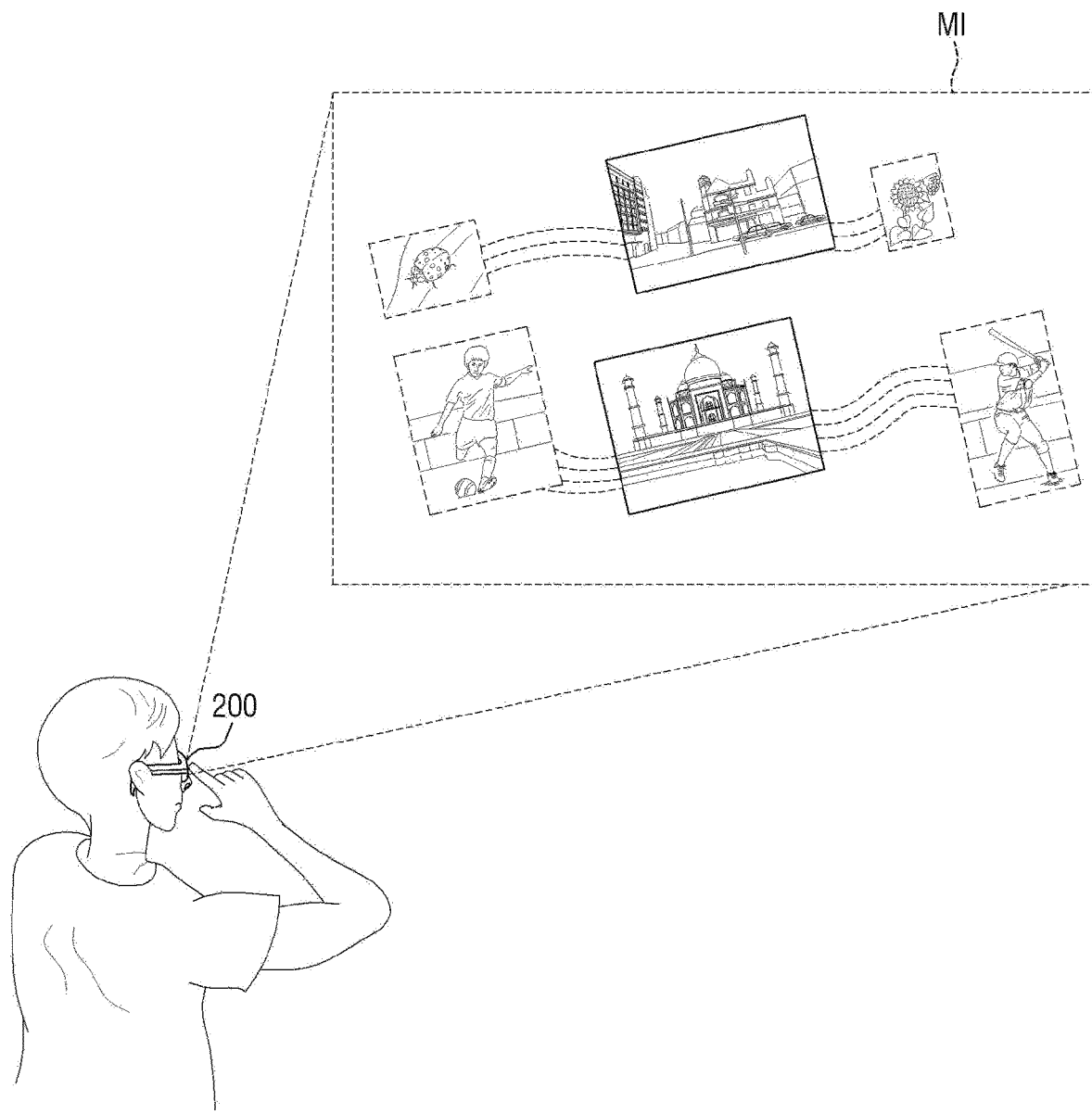
FIG. 1 is a schematic view showing an application of a display device for providing augmented reality contents according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A device for providing augmented reality contents according to an embodiment of the disclosure will be described in detail with reference to the accompanying drawings.

FIG. 1 is a schematic view showing an application of a display device for providing augmented reality contents according to an embodiment of the disclosure.

A display device for providing augmented reality contents 200 shown in FIG. 1 may be formed integrally with a frame in the form of glasses that a user can readily carry and put on/take off it, or may be mounted or assembled on the frame. The display device for providing augmented reality contents 200 may provide an augmented reality contents image MI to a user's eyes through a transparent lens so that the augmented reality contents image MI may be superimposed on the real world image seen by the user's eyes through the transparent lens. The augmented reality contents displayed by the display device for providing augmented reality contents 200 may be two-dimensional or three-dimensional image contents in which a graphic image, a captured image, text, etc. are combined, and/or sound contents, etc.

The device for providing augmented reality contents 200 may include at least one display module (display part) for displaying an augmented reality contents image MI, and at least one optical module (optical part) for creating display paths (or the light paths) of the augmented reality contents image MI so that the augmented reality contents image MI displayed on the display module can be perceived by the user's eyes through a transparent lens.

The display device for providing augmented reality contents 200 may sense a user's touch on an optical module or a surface adjacent to the optical module by using the display light for the augmented reality contents image MI displayed in the display module. To this end, the exterior of the optical module incorporated into the display device for providing augmented reality contents 200 may be used as a touch surface working as a user interface.

More specifically, the display module of the display device for providing augmented reality contents 200 may emit display light for displaying the augmented reality contents image MI, and the optical module may form paths of the display light for the augmented reality contents image MI so that the augmented reality contents image MI may be displayed on the transparent lens. In case that the user touches the exterior of the optical module forming light paths, the optical module senses a change in the amount of light on the light paths caused by the user's touch, to sense whether there is a user's touch and the touch position, if any. The display device for providing augmented reality contents 200 may display the touch sensing state based on a change in the amount of the display light for displaying the augmented reality contents image MI as the augmented reality contents image MI in real time, and activates the user interface function. Accordingly, after the user touches the exterior of the optical module, the user can see the touch sensing state and whether the user interface function is activated from the augmented reality contents image MI. Hereinafter, the elements of the display device for providing augmented reality contents 200 will be described in more detail with reference to the accompanying drawings.

Figure 2:
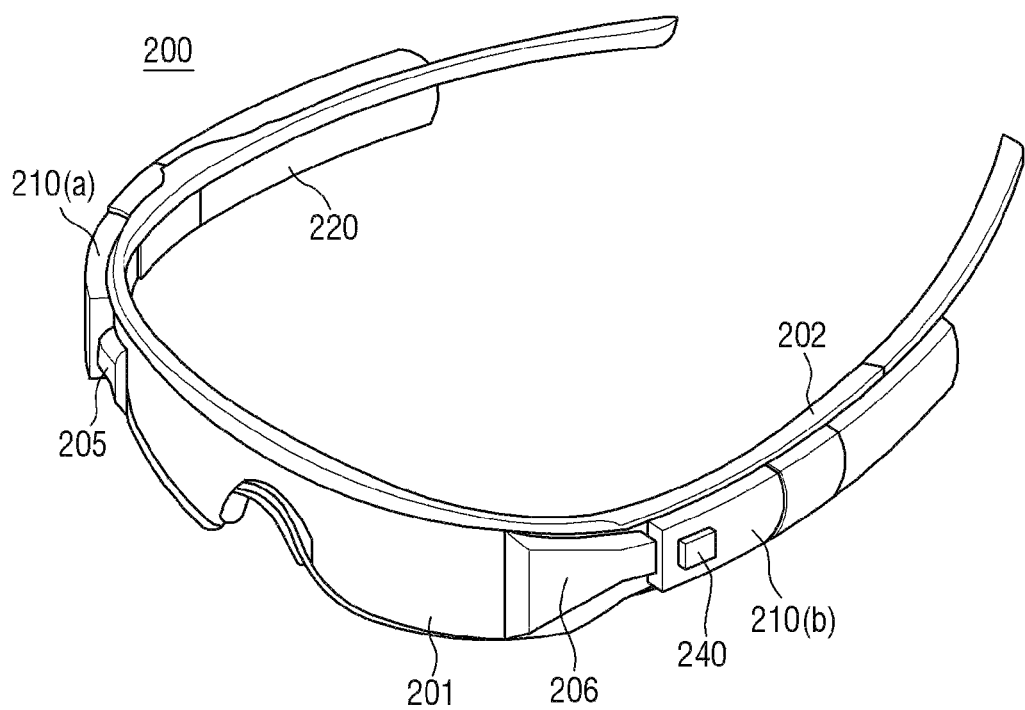
FIG. 2 is a schematic perspective view showing a display device for providing augmented reality contents implemented in the form of glasses according to an embodiment of the disclosure.
Figure 3:
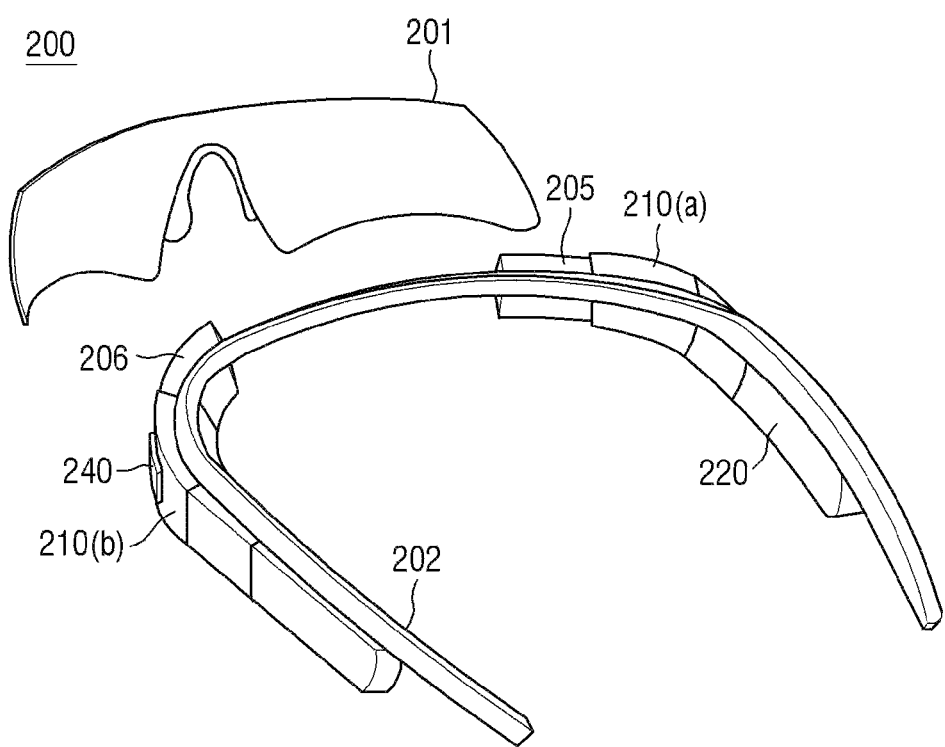
FIG. 3 is an exploded schematic perspective view of the display device for providing augmented reality contents shown in FIG. 2 when viewed from a side.
Figure 4:
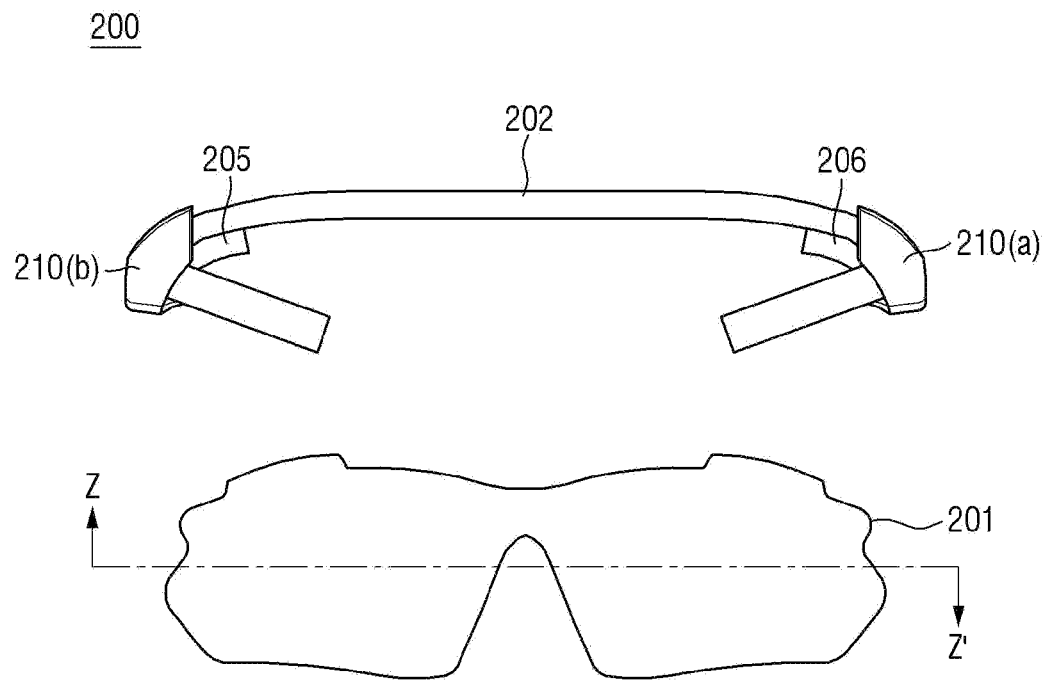
FIG. 4 is an exploded schematic perspective view of the device for providing augmented reality contents shown in FIGS. 2 and 3 when viewed from the rear side.
Figure 5:
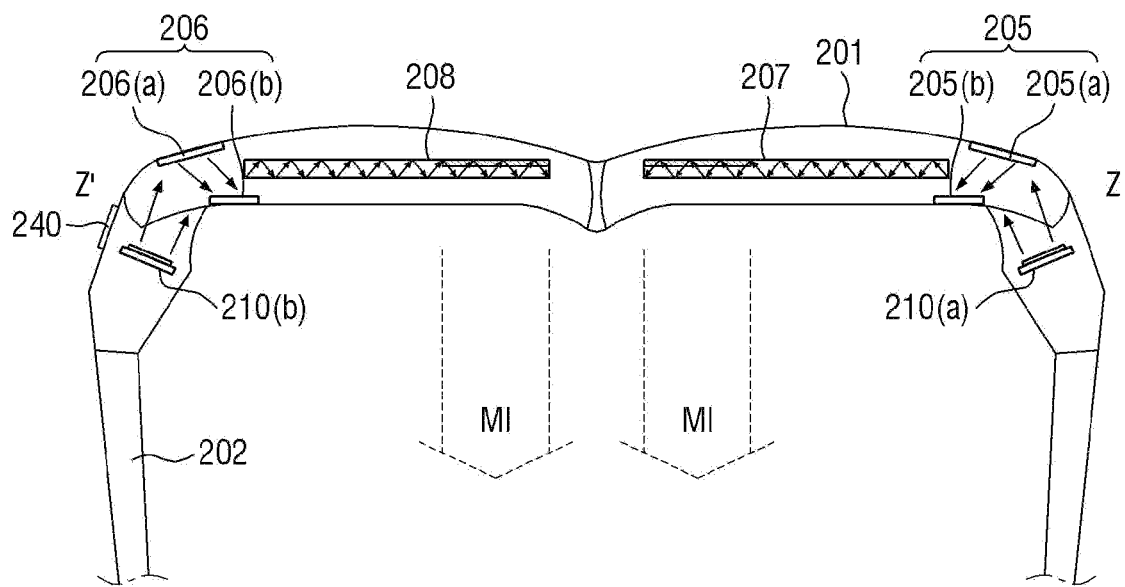
FIG. 5 is a schematic view of a surface cut along line Z-Z' shown in FIG. 4 when viewed from the top.

FIG. 2 is a schematic perspective view showing a display device for providing augmented reality contents implemented in the form of glasses according to an embodiment of the disclosure. FIG. 3 is an exploded schematic perspective view of the display device for providing augmented reality contents shown in FIG. 2 when viewed from a side. FIG. 4 is an exploded schematic perspective view of the device for providing augmented reality contents shown in FIGS. 2 and 3 when viewed from the rear side. FIG. 5 is a schematic view of a surface cut along line Z-Z' shown in FIG. 4 when viewed from the top.

Referring to FIGS. 2 to 5, the display device for providing augmented reality contents 200 may be implemented in the form of glasses, and accordingly at least one transparent lens 201, and a support frame 202 supporting the at least one transparent lens 201 may be formed integrally with each other.

The transparent lens 201 may have left and right parts connected with each other or may have a first transparent lens and a second transparent lens separately on the left side and right side, respectively. The transparent lens 201 having the left and right parts formed integrally or the first and second transparent lenses formed separately may be made of glass or plastic so that it may be transparent or translucent. Accordingly, the user can see the image of the real world through the transparent lens 201 which has the left and right parts formed integrally or the first and second transparent lenses formed separately. The transparent lens 201, which may be either the integrated parts or the separated first and second transparent lenses, may have refractive power in consideration of the user's eyesight.

The support frame 202 may be implemented in a glasses-like shape including a frame for supporting the edges of the at least one transparent lens 201 and temples. The shape of the support frame 202 is not limited to a glasses type, but may be formed in a goggles type or a head mountain type including a transparent lens.

The display device for providing augmented reality contents 200 may be assembled with the transparent lens 201 and the support frame 202. The display device for providing augmented reality contents 200 may include one or more display modules 210(a) and 210(b), one or more optical modules 205 and 206, a sensing module 240, and a control module (controller) 220.

Referring to FIG. 5, the one or more display modules 210(a) and 210(b) may be formed integrally with or assembled on one side or both sides of the support frame 202, and they may display the augmented reality contents image MI according to the control by the control module 220. In the example shown in FIGS. 2 to 5, the first and second display modules 210(a) and 210(b) are formed integrally on both sides of the support frame 202, respectively.

The one or more display modules 210(a) and 210(b) may include a micro LED display device (micro-LED), a nano LED display device (nano-LED), an organic light-emitting display device (OLED), an inorganic light-emitting display device (inorganic EL), a quantum-dot light-emitting display device (QED), a cathode ray display device (CRT), a liquid-crystal display device (LCD), etc. In the following description, a micro LED display device may be included in the one or more display modules 210(a) and 210(b). The micro LED display device will be simply referred to as a display device unless it is necessary to discern between the micro LED display device and the display device. It should be understood, however, that the embodiments of the disclosure are not limited to the micro LED display devices, and any other display device listed above or related may be employed without departing from the scope of the disclosure.

The one or more optical modules 205 and 206 may form light paths so that the display light for the augmented reality contents image MI displayed in the one or more display modules 210(a) and 210(b) may be transmitted to the transparent lens 201 and the augmented reality contents image MI may be displayed on the transparent lens 201. To this end, the one or more optical modules 205 and 206 may be formed integrally with or assembled on the transparent lens 201 having left and right parts connected with each other or having a first transparent lens and a second transparent lens separated on the left side and right side, respectively. For example, the one or more optical modules 205 and 206 may be incorporated into the entire surface or a partial surface of the transparent lens 201 and may be formed integrally with a part of the transparent lens 201. In the example shown in FIGS. 2 to 5, the first and second optical modules 205 and 206 are formed on both sides of the support frame 202, respectively.

For example, the first optical module 205 may include one or more reflective members 205(a) and 205(b) that reflect the display light for the augmented reality contents image MI displayed in the first display module 210(a) to supply it to the transparent lens 201. As indicated by the arrows in FIG. 5, in the first optical module 205, the display light for the augmented reality contents image MI displayed in the first display module 210(a) may be reflected by the first reflective member 205(a), and the reflected display light may be reflected by the second reflective member 205(b), so that it may be supplied to the transparent lens 201.

The exterior of the first optical module 205 may be used as the touch surface working as a user interface. In case that a user's finger or a writing tool is brought into touch with the exterior of the first optical module 205, the amount of light in the vicinity of the first optical module 205 decreases. As a result, the amount of light incident on the one or more reflective members 205(a) and 205(b) that reflect the display light for the augmented reality contents image MI and the amount of reflected light decrease. Accordingly, in order to sense the amount of light incident on and reflected by the one or more reflective members 205(a) and 205(b), at least one light-receiving sensor may be disposed at the one or more reflective members 205(a) and 205(b). Accordingly, the at least one light-receiving sensor may supply a light amount detection signal that varies according to a user's touch to the control module 220.

In the second optical module 206, the display light for the augmented reality contents image MI displayed in the second display module 210(b) may be supplied to the transparent lens 201. To this end, the second optical module 206 may also include one or more reflective members 206(a) and 206(b). As indicated by the arrows in FIG. 5, in the second optical module 206, the display light for the augmented reality contents image MI displayed in the second display module 210(b) may be reflected by the third reflective member 206(a), and the reflected display light may be reflected by the fourth reflective member 206(b), so that it may be supplied to the transparent lens 201.

Like the first optical module 205, the second optical module 206 may also be used as a touch surface working as a user interface. For example, in case that a user's finger or a writing tool is brought into touch with the exterior of the second optical module 206, the amount of light in the vicinity of the second optical module 206 decreases. As a result, the amount of light incident on the one or more reflective members 206(a) and 206(b) and the amount of reflected light decrease. In order to sense the amount of incident light incident and reflected light by the one or more reflective members 206(a) and 206(b), at least one light-receiving sensor may be disposed at each of the reflective members 206(a) and 206(b). Accordingly, the at least one light-receiving sensor may supply a light amount detection signal that varies according to a user's touch to the control module 220. The structure of the first and second optical modules 205 and 206 will be described later in more detail with reference to the accompanying drawings.

Referring to FIG. 5, the transparent lens 201 may further include first and second optical panels 207 and 208 that may form display paths of display lights for the augmented reality contents image MI incident from the first and second optical modules 205 and 206, respectively, to provide the display lights for the augmented reality contents image MI toward the user's eyes. The first and second optical panels 207 and 208 may be formed in a flat plate shape, and may be disposed so that their flat surfaces face the user's left and right eyes, respectively.

Each of the first and second optical panels 207 and 208 may be made of transparent or translucent glass or acrylic, and may be formed in a circular shape, a quadrangular shape, or a polygonal planar shape. Each of the first and second optical panels 207 and 208 may include a grating coupler formed on at least a part of the front or rear surface to form an optical waveguide so that the display path of the augmented reality contents image MI may be changed. The first and second optical panels 207 and 208 may be formed such that the display lights for the augmented reality contents image MI incident from one side and the opposite side, respectively, are refracted in directions predetermined by the surfaces of the first and second optical panels 207 and 208 and the angle of the grating coupler and are transmitted to the user's eyes.

The sensing module 240 may be assembled or formed integrally with the support frame 202 or the exterior of the display device for providing augmented reality contents 200, and may sense the distance (or depth) to an object on the front side of the support frame 202, the illuminance, the moving direction of the support frame 202, the moving distance, tilt, etc. To this end, the sensing module 240 may include a depth sensor such as an infrared sensor and a LiDAR sensor, and an image sensor such as a camera. The sensing module 240 may further include first and second biosensors for detecting movement information of the user's eyes or pupils.

The control module 220 may be assembled to at least one side of the support frame 202 or may be integrally formed with the support frame 202 together with one of the first and second display modules 210(a) and 210(b).

The control module 220 may modulate the image data of the augmented reality contents that may be previously stored or received from an external device appropriately for image display characteristics such as the resolution and driving frequency characteristics of the first and second display modules 210(a) and 210(b), to transmit the image data to each of the first and second display modules 210(a) and 210(b). The control module 220 may simultaneously supply the driving control signals to the first and second display modules 210(a) and 210(b) so that the first and second display modules 210(a) and 210(b) display the augmented reality contents image MI simultaneously.

The control module 220 may receive light amount detection signals in real time from the first and second optical modules 205 and 206 while controlling the first and second optical modules 205 and 206 so that they display the augmented reality contents image MI. The user's touch on at least one of the first and second optical modules 205 and 206 may be detected based on analysis results of the light amount detection signals. In case that the user's touch is detected, the control module 220 may display the results of the user's touch sensing on the augmented reality contents image MI and activate the user interface function. In case that the user interface function is activated, predetermined operations such as image display operation and motion sensing may be carried out pursuant to the user's touch.

The operation of the control module 220 will be described in more detail as follows:

The control module 220 may receive, in real time, light amount detection signals from at least one light-receiving sensor included in the first optical module 205 and at least one light-receiving sensor included in the second optical module 206. The light amount detection signals may be subjected to digital conversion, and the average value of the light amount detection signals may be compared with the magnitude value of the light amount detection signals of the light-receiving sensors at every predetermined frame. At least one light-receiving sensor outputting a light amount detection signal having a lower magnitude than the average value by a predetermined reference difference value may be selected out. The control module 220 may determine that the user's touch is made in the vicinity of the selected light-receiving sensor. The control module 220 may specify a display region on the augmented reality contents image that corresponds to the information on the location of the light-receiving sensor touched by the user, and modulate the image data of the specified display region to transmit the image data to the first and second display modules 210(a) and 210(b). Accordingly, a touch sensing state according to a change in the amount of display light for the augmented reality contents image MI may be displayed on the augmented reality contents image MI in real time.

The function of the control module 220 that provides a user interface by displaying the position of a sensed user's touch on an augmented reality contents image MI will be described in detail with reference to FIG. 14. As such, after displaying the touch sensing state on the augmented reality contents image MI, by activating the user interface function, predetermined operations such as image display operation or motion sensing may be carried out pursuant to the user's touch.

Figure 6:
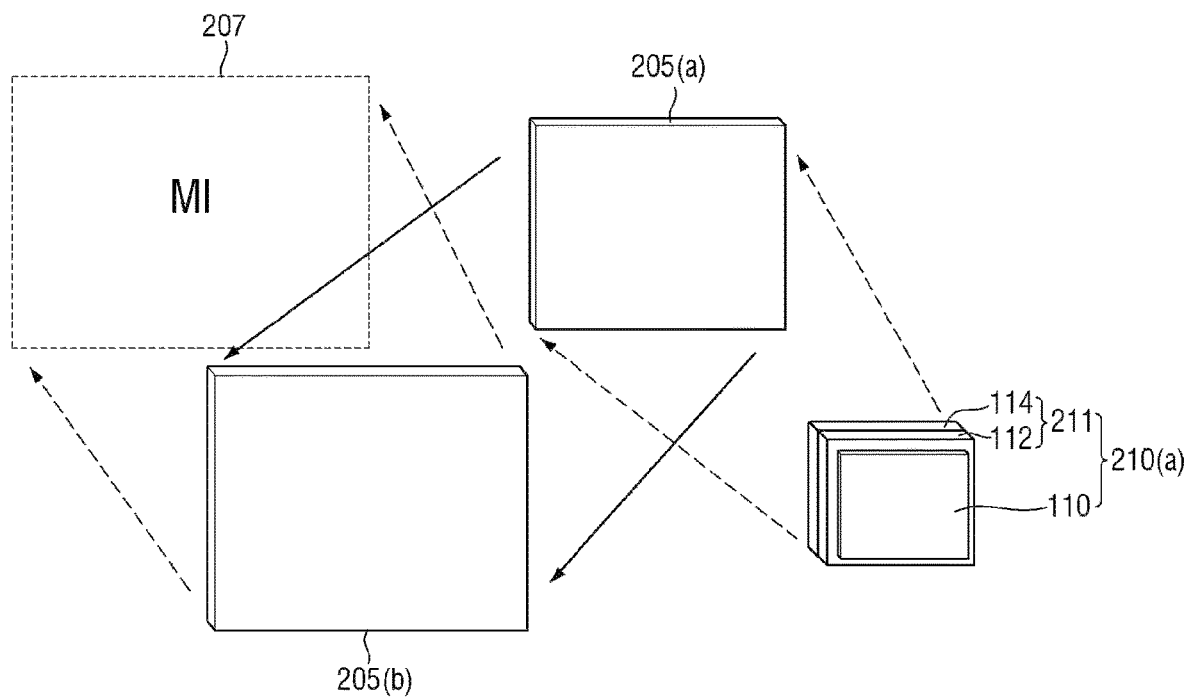
FIG. 6 is a schematic view showing a structure in which the optical module forms paths of the display lights for the augmented reality contents image displayed in the first display module shown in FIG. 5.
Figure 7:
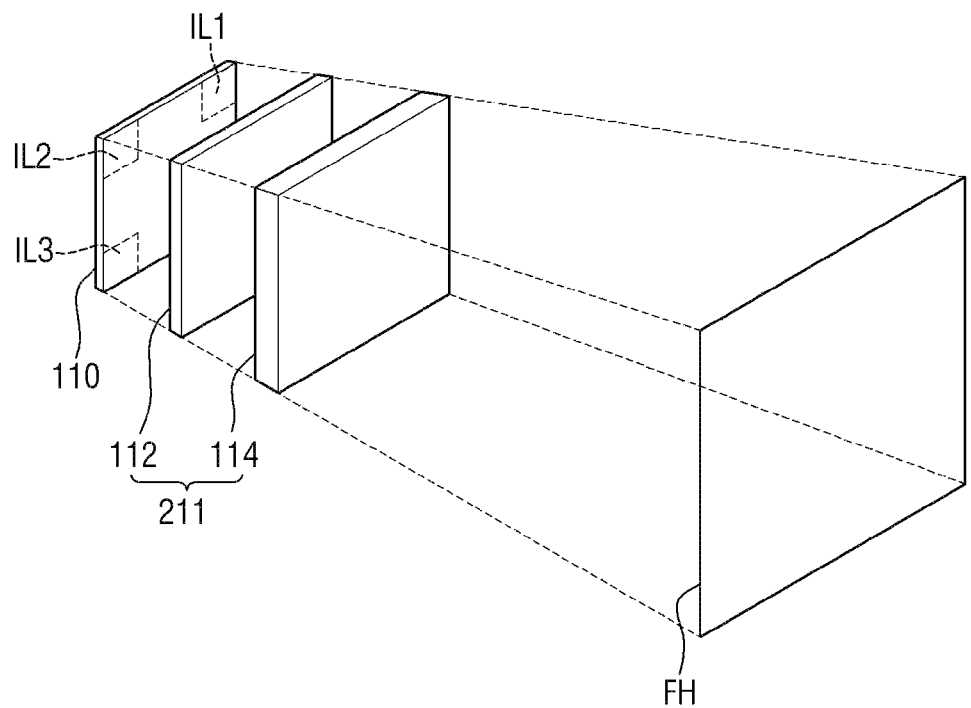
FIG. 7 is a view schematically showing the first display module shown in FIG. 6.

FIG. 6 is a schematic view showing a structure in which the optical module may form paths of the display lights for the augmented reality contents image displayed in the first display module shown in FIG. 5. FIG. 7 is a view schematically showing the first display module shown in FIG. 6.

Specifically, FIG. 6 shows the structure of the first optical module 205 for forming light paths in which the display light for the augmented reality contents image MI displayed in the first display module 210(a) may be sequentially reflected by the first and second reflective members 205(a) and 205(b) and may be supplied to the first optical panel 207 of the transparent lens 201. Although the light paths are formed using the first and second reflective members 205(a) and 205(b) in the example shown in FIG. 6, the number of the reflective members is not limited thereto. A single reflective member or more than two reflective members may be employed.

Referring to FIGS. 6 and 7, the first display module 210(a) may display the augmented reality contents image toward the first reflective member 205(a), so that the display light for the augmented reality contents image may be reflected by the first reflective member 205(a). To this end, the first display module 210(a) may include at least one image displayer 110 for displaying an augmented reality contents image, and an image transmission member 211 for applying the display light for the augmented reality contents image toward the first reflective member 205(a). The image transmission member 211 may include at least one optical member among an optical waveguide (e.g., a prism), a diffusion lens 112 and a focusing lens 114. Accordingly, the augmented reality contents image displayed by each image displayer 110 may be provided toward the first reflective member 205(a) through the optical waveguide, the diffusion lens 112 and at least one focusing lens 114.

The display light for the augmented reality contents image MI displayed in the first display module 210(a) and reflected by the first reflective member 205(a) may be provided to the second reflective member 205(b) along the reflection angle of the first reflective member 205(a). To this end, the incidence angle and the exit angle of the first reflective member 205(a) may be set such that the display light of the first display module 210(a) may be reflected toward the second reflective member 205(b).

The second reflective member 205(b) reflects the display light for the augmented reality contents image MI reflected from the first reflective member 205(a) to supply display light to the first optical panel 207 of the transparent lens 201. To this end, the incidence and exit angles of the second reflective member 205(b) may be set such that the display light reflected from the first reflective member 205(a) may be reflected toward the first optical panel 207.

The image displayer 110 included in the first display module 210(a) may include a micro LED display device (micro-LED), a nano LED display device (nano-LED), an organic light-emitting display device (OLED), an inorganic light-emitting display device (inorganic EL), a quantum-dot light-emitting display device (QED), a cathode ray display device (CRT), a liquid-crystal display device (LCD), etc. In the following description, the image displayer 110 includes a micro LED display device as an example. It should be understood, however, that the embodiments of the disclosure are not limited to the micro LED display devices, and any other display device listed above or related may be employed without departing from the scope of the disclosure.

Figure 8:
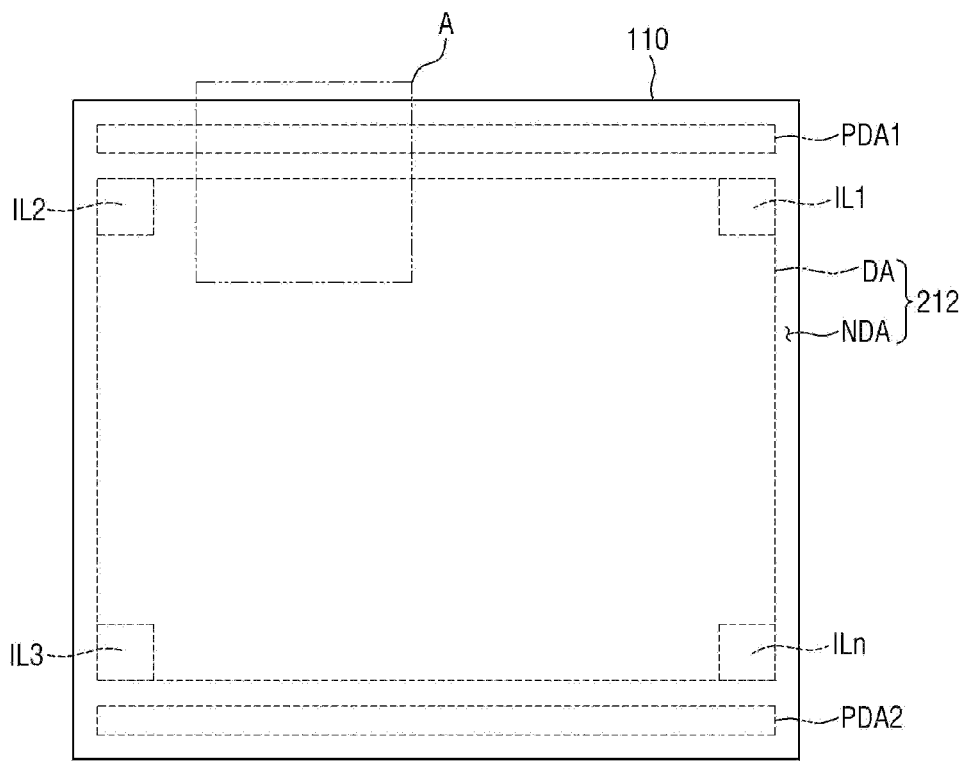
FIG. 8 is a schematic view showing in detail a layout of the image displayer shown in FIG. 7.

As shown in FIGS. 7 and 8, touch sensing display regions IL1 to ILn may be defined in the image displayer 110, which may correspond to the light-receiving sensor forming regions of the first reflective member 205(a), respectively.

The control module 220 may define the touch sensing display regions IL1 to ILn so that they correspond to the light-receiving sensor forming regions that output the light amount detection signals, and may modulate the image data of the touch sensing display regions IL1 to ILn based on the touch sensing results.

For example, the control module 220 may receive light amount detection signals in real time from the first and second optical modules 205 and 206 while it controls the first and second optical modules 205 and 206 so that they may display the augmented reality contents image MI. In case that a user's touch is detected, the control module 220 modulates the image data of the touch sensing display regions IL1 to ILn corresponding to the light-receiving sensor regions and displays it. For example, the control module 220 may modulate image data of at least one of the touch sensing display regions IL1 to ILn based on the user's touch position into grayscale image data, so that the touch sensing display regions IL1 to ILn according to the touch position can be displayed in black. The control module 220 may activate the user interface function.

In case that the interface function is activated, the control module 220 may control the operation of displaying the augmented reality contents, such as adjusting the volume of audio or adjusting the brightness of an image according to the user's touch position. The control module 220 may modulate the position of an object on the augmented reality contents image according to the user's touch position, or may modulate the display colors of the augmented reality contents image by image data modulation. The control module 220 may control the sensing operation of the sensing module 240.

Figure 9:
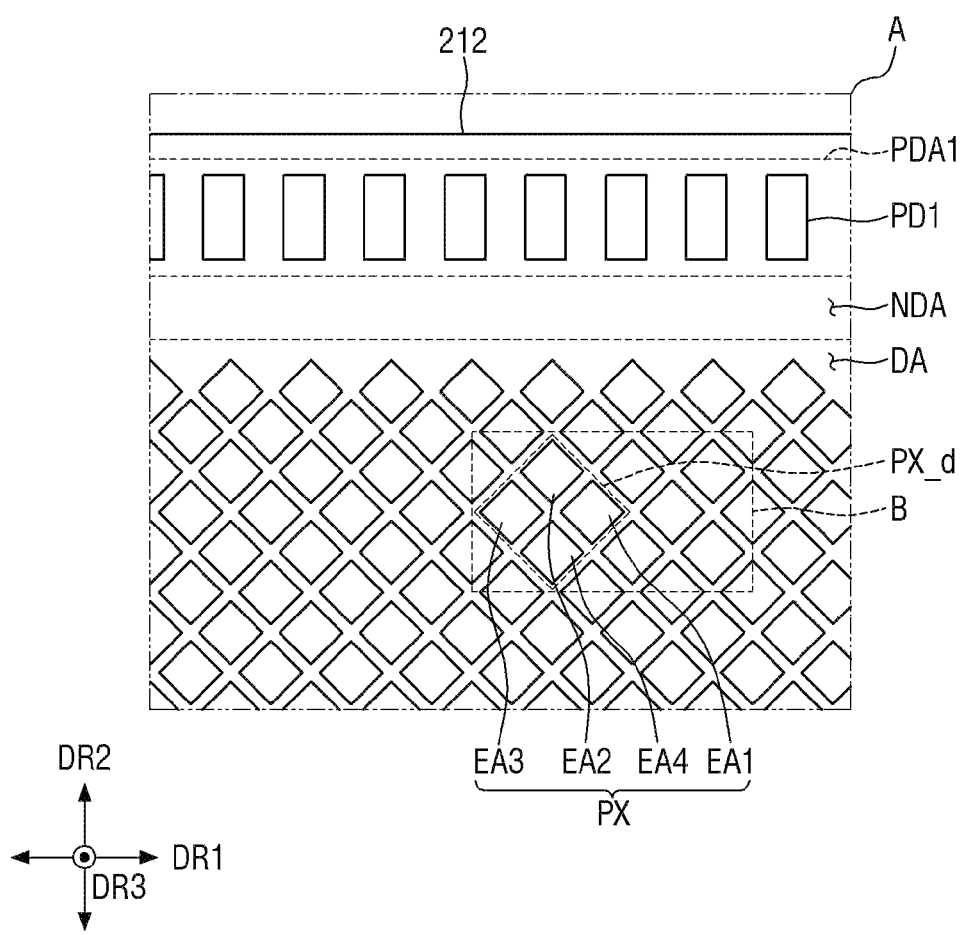
FIG. 9 is a schematic layout diagram showing in detail area A of FIG. 8.
Figure 10:
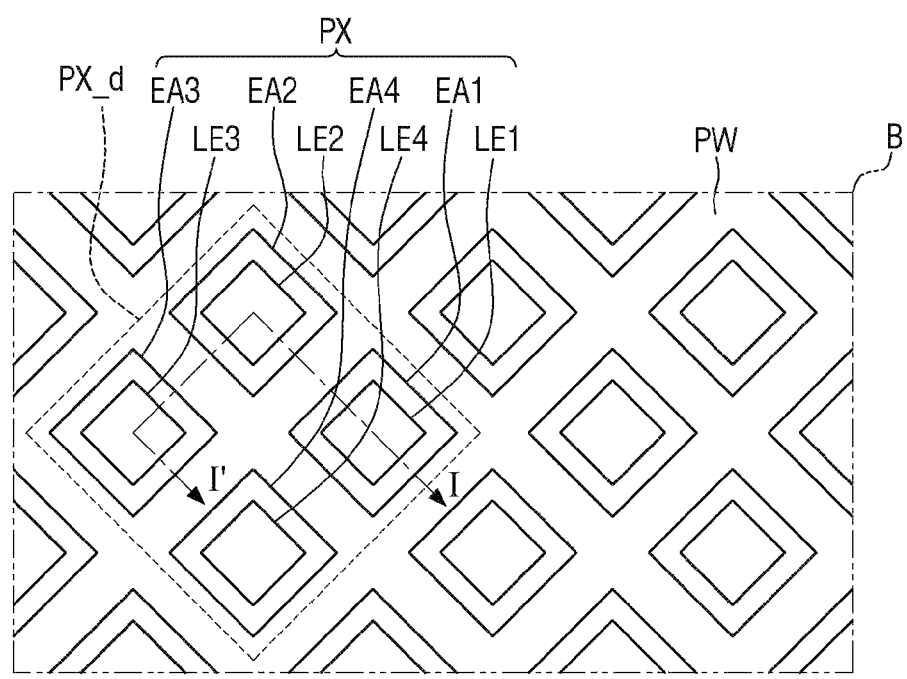
FIG. 10 is a schematic view showing in detail a layout of pixels shown in area B of FIG. 9.
Figure 10:
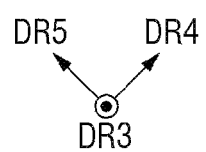

FIG. 8 is a schematic view showing in detail a layout of the image displayer shown in FIG. 7. FIG. 9 is a schematic view showing in detail a layout of area A of FIG. 8. FIG. 10 is a schematic view showing in detail a layout of pixels shown in area B of FIG. 9.

The image displayer 110 according to an embodiment of FIGS. 8 to 10 has been described with an example of a light-emitting diode on silicon (LEDoS) structure in which light-emitting diodes are disposed on a semiconductor circuit board formed via a semiconductor process. It should be noted, however, that the embodiments of the disclosure are not limited thereto. Although the image displayer 110 according to an embodiment of the disclosure may be a micro light-emitting diode display module (micro or nano light-emitting diode display module) including micro light-emitting diodes (micro or nano light-emitting diodes) as light-emitting elements, the embodiments of the disclosure are not limited thereto.

In FIGS. 8 to 10, a first direction DR1 refers to the horizontal direction of the image displayer 110, a second direction DR2 refers to the vertical direction of the image displayer 110, and a third direction DR3 refers to the thickness direction of a display panel 212 or the thickness direction of a semiconductor circuit board 215. A fourth direction DR4 indicates a diagonal direction of the display panel 212, and a fifth direction DR5 indicates a diagonal direction crossing the fourth direction DR4. As used herein, the terms "left," "right," "upper" and "lower" sides indicate relative positions when the display panel 212 is viewed from the top. For example, the right side refers to a side in the first direction DR1, the left side refers to another side in the first direction DR1, the upper side refers to a side in the second direction DR2, and the lower side refers to another side in the second direction DR2. The upper portion refers to a side indicated by the arrow of the third direction DR3, while the lower portion refers to an opposite side in the third direction DR3.

Referring to FIGS. 8 to 10, the image displayer 110 may have a display panel 212 including a display area DA and a non-display area NDA.

The display panel 212 of the image displayer 110 may have a rectangular shape having longer sides in the first direction DR1 and shorter sides in the second direction DR2 when viewed from the top. It should be understood, however, that the shape of the display panels 212 when viewed from the top is not limited thereto. It may have a polygonal, circular, oval, or irregular shape other than the rectangular shape when viewed from the top.

In the display area DPA, images can be displayed. In the non-display area NDA, no image may be displayed. The shape of the display area DA may follow the shape of the display panel 212 when viewed from the top. In the example shown in FIG. 6, the display area DA has a rectangular shape when viewed from the top. The display area DA may be disposed at the central area of the display panel 212. The non-display area NDA may be disposed around the display area DA. The non-display area NDA may surround the display area DA.

In the display area DA of the display panel 212, the touch sensing display regions IL1 to ILn may be defined which may be associated with the regions of the first reflective member 205(a) where the light-receiving sensors are formed. The image data displayed at the touch sensing display regions IL1 to ILn may be modulated by the control module 220 according to the user's touch position and may be displayed.

The first pad area PDA1 may be disposed in the non-display area NDA. The first pad area PDA1 may be located at the upper portion of the display panel 212. The first pad area PDA1 may include first pads PD1 connected to an external circuit board. The second pad area PDA2 may be disposed in the non-display area NDA. The second pad area PDA2 may be disposed at the lower portion of the semiconductor circuit board. The second pad area PDA2 may include second pads connected to an external circuit board. The second pad area PDA2 may be eliminated.

The display area DA of the display panel 212 may include a plurality of pixels PX. Each of the pixels PX may be defined as the minimum light-emitting unit for reproducing white light in a defined pixel area PX_d.

Each of the pixels PX disposed as the minimum unit capable of reproducing white light in the pixel area PX_d may include a plurality of emission areas EA1, EA2, EA3 and EA4. Although each of the pixels PX may include four light-emitting areas EA1, EA2, EA3 and EA4 arranged in a Pentile™ matrix in an embodiment of the disclosure, the disclosure is not limited thereto. For example, each of the plurality of pixels PX may include only three emission areas EA1, EA2 and EA3.

The emission areas EA1, EA2, EA3 and EA4 of each pixel area PX_d may be partitioned by the partition wall or bank PW. The partition wall PW may be disposed to surround the first to fourth light-emitting elements LE1 to LE4 disposed in the emission areas EA1, EA2, EA3 and EA4. The partition wall PW may be disposed apart from the first to fourth light-emitting elements LE1 to LE4. The partition wall PW may have a mesh shape, a net shape, or a grid shape when viewed from the top.

Although each of the emission areas EA1, EA2, EA3 and EA4 defined by the partition wall PW may have a diamond shape when viewed from the top which form the Pentile™ matrix in the example shown in FIGS. 9 and 10, the disclosure is not limited thereto. For example, each of the emission areas EA1, EA2, EA3 and EA4 defined by the partition wall PW may have a polygonal shape such as a quadrangle and triangle, a circular shape, an oval shape, or irregular shape other than a diamond shape.

Referring to FIG. 10, among the plurality of emission areas EA1, EA2, EA3 and EA4, the first emission area EA1 may include a first light-emitting element LE1 that emits a first light, the second emission area EA2 may include a second light-emitting element LE2 that emits a second light, the third emission area EA3 may include a third light-emitting element LE3 that emits a third light, and the fourth emission area EA4 may include a fourth light-emitting element LE4 that emits a fourth light. The first light may be light of a wavelength range reproducing one of red, green and blue colors. The second light may be light of a wavelength range that reproduces one of red, green and blue colors, which may be different from the first light. The third light may be light of a wavelength range that reproduces one of red, green and blue colors, which may be different from the first light and the second light. The fourth light may be light of the same wavelength range as one of the first to third lights.

Each of the first to fourth light-emitting elements LE1 to LE4 included in the first to fourth emission areas EA1 to EA4, respectively, arranged in a Pentile™ matrix may have a diamond shape when viewed from the top, but the disclosure is not limited thereto. For example, each of the first to fourth light-emitting elements LE1 to LE4 may have a polygonal shape such as a triangle and quadrangle, a circular shape, an oval shape, or irregular shape other than a diamond shape.

Each of the first emission areas EA1 may emit the first light. Each of the first emission areas EA1 may output the first light emitted from the first light-emitting element LE1. As described above, the first light may be light of a wavelength range reproducing one of red, green, and blue colors. For example, the first light may be light in the red wavelength range. The red wavelength range may be approximately 600 nm to approximately 750 nm, but embodiments of the disclosure are not limited thereto.

Each of the second emission areas EA2 may emit a second light. Each of the second emission areas EA2 may output the second light emitted from the second light-emitting element LE2. The second light may be light of a wavelength range that reproduces one of red, green and blue colors, which may be different from the first light. For example, the second light may be light in the blue wavelength range. The blue wavelength range may be approximately 370 nm to approximately 460 nm, but embodiments of the disclosure are not limited thereto.

Each of the third emission areas EA3 may emit a third light. Each of the third emission areas EA3 may output the third light emitted from the third light-emitting element LE3. The third light may be light of a wavelength range that reproduces one of red, green and blue colors, which may be different from the first light and the second light. For example, the third light may be light in the green wavelength range. The green wavelength range may be approximately 480 nm to approximately 560 nm, but embodiments of the disclosure are not limited thereto.

Each of the fourth emission areas EA4 may emit the fourth light. Each of the fourth emission areas EA4 may output the fourth light emitted from the fourth light-emitting element LE4. The fourth light may be light of the same wavelength range that reproduces the same color as one of the first to third lights. For example, the fourth light may be light of the same blue wavelength band as the second light, or light of the same green wavelength band as the third light. The embodiments of the disclosure are not limited thereto.

The second emission areas EA2 of the pixels PX may alternately arranged with the fourth emission areas EA4 of adjacent pixels PX along the first direction DR1 which may be the horizontal (or row) direction. The first emission areas EA1 and the third emission areas EA3 of the pixels PX may be alternately arranged along the first direction DR1, which may be the horizontal (or row) direction. On the other hand, the fourth emission areas EA4 of the pixels PX may alternately arranged with the second emission areas EA2 of adjacent pixels PX along the first direction DR1 which may be the horizontal (or row) direction.

The first emission areas EA1 and the fourth emission areas EA4 may be alternately arranged in the fourth direction DR4 which may be a first diagonal direction, and the second emission areas EA2 and the third emission areas EA3 may also be alternately arranged in the fourth direction DR4 that may be the first diagonal direction. Accordingly, the second emission areas EA2 and the first emission areas EA1 may be alternately arranged in the fifth direction DR5 which may be a second diagonal direction, and the third emission areas EA3 and the fourth emission areas EA4 may also be alternately arranged in the fifth direction DR5 which may be the second diagonal direction, such that the pixels PX may also be arranged generally in the Pennle™ matrix.

The size or area of each of the first to fourth emission areas EA1 to EA4 of each of the pixels PX may have the same size or area or different sizes or areas. Similarly, the first to fourth light-emitting elements LE1 to LE4 respectively formed in the first to fourth emission areas EA1 to EA4 may have the same size or area or different sizes or areas.

Specifically, the area of the first emission area EA1, the area of the second emission area EA2, the area of the third emission area EA3 and the area of the fourth emission area EA4 may be substantially all equal. It should be understood, however, that the disclosure is not limited thereto. For example, the first and second emission areas EA1 and EA2 may have different areas, the second and third emission areas EA2 and EA3 may have different areas, and the third and fourth emission areas EA3 and EA4 may have different areas. In this instance, at least two pairs of the first to fourth emission areas EA1 to EA4 may have the same area.

The distance between the first and second emission areas EA1 and EA2, the distance between the second and third emission areas EA2 and EA3, the distance between the third and fourth emission areas EA3 and EA4, and the distance between the first and fourth emission areas EA1 and EA4, which are adjacent to each other in the horizontal or diagonal direction, may be all equal or may be different from each other depending on the varying areas. The embodiments of the disclosure are not limited thereto.

Although the first emission area EA1 may emit the first light, the second emission area EA2 may emit the second light, the third emission area EA3 may emit the third light, and the fourth emission area EA4 may emit the same light as one of the first to third lights in the foregoing description, this is merely illustrative. At least one of the first to fourth emission areas EA1 to EA4 may emit a fifth light. The fifth light may be light of the yellow wavelength range. Specifically, the main peak wavelength of the fifth light may range approximately from 550 nm to approximately 600 nm, but embodiments of the disclosure are not limited thereto.

Figure 11:
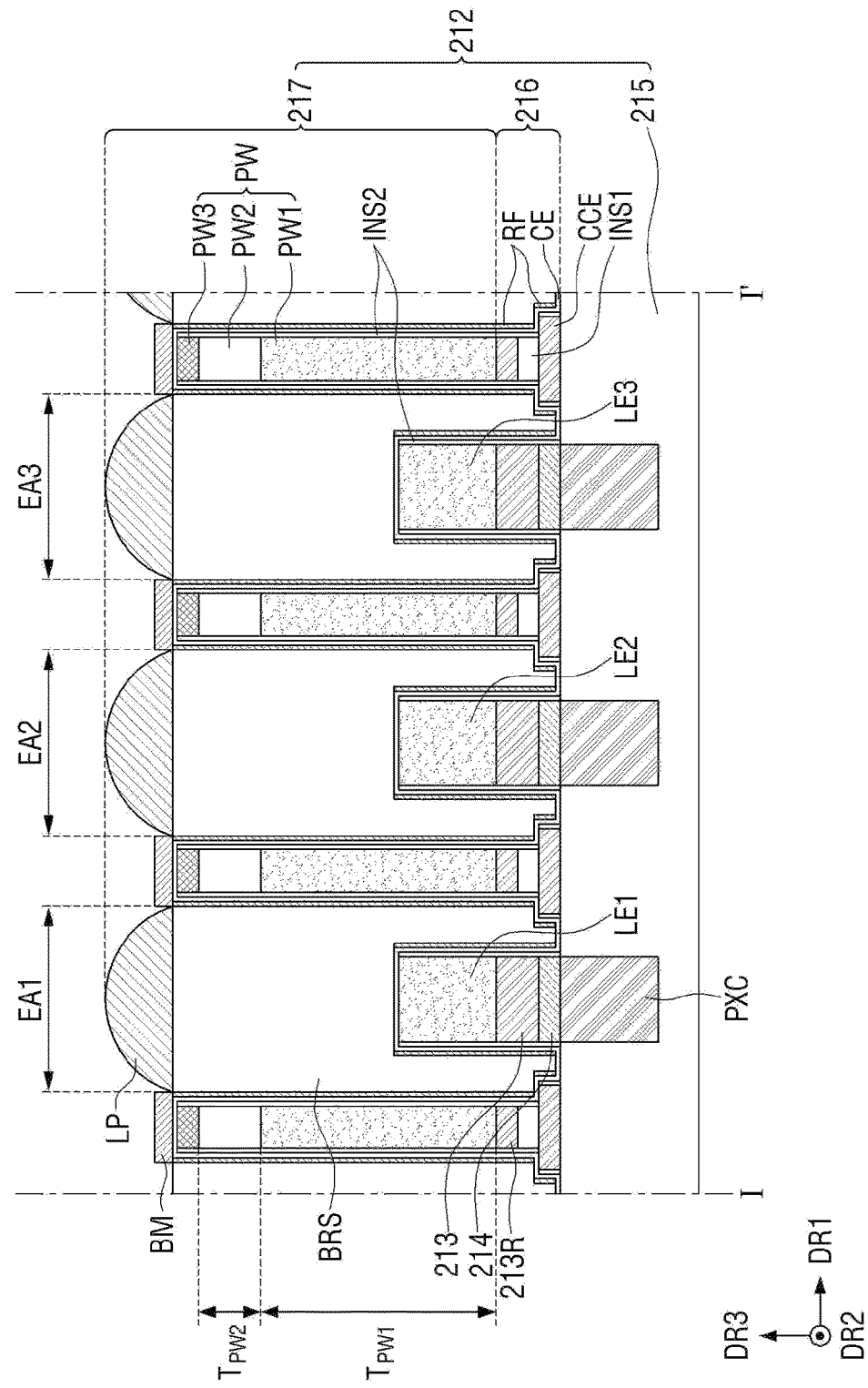
FIG. 11 is a schematic cross-sectional view showing an example of the image displayer, taken along line I-I' of FIG. 10.
Figure 12:
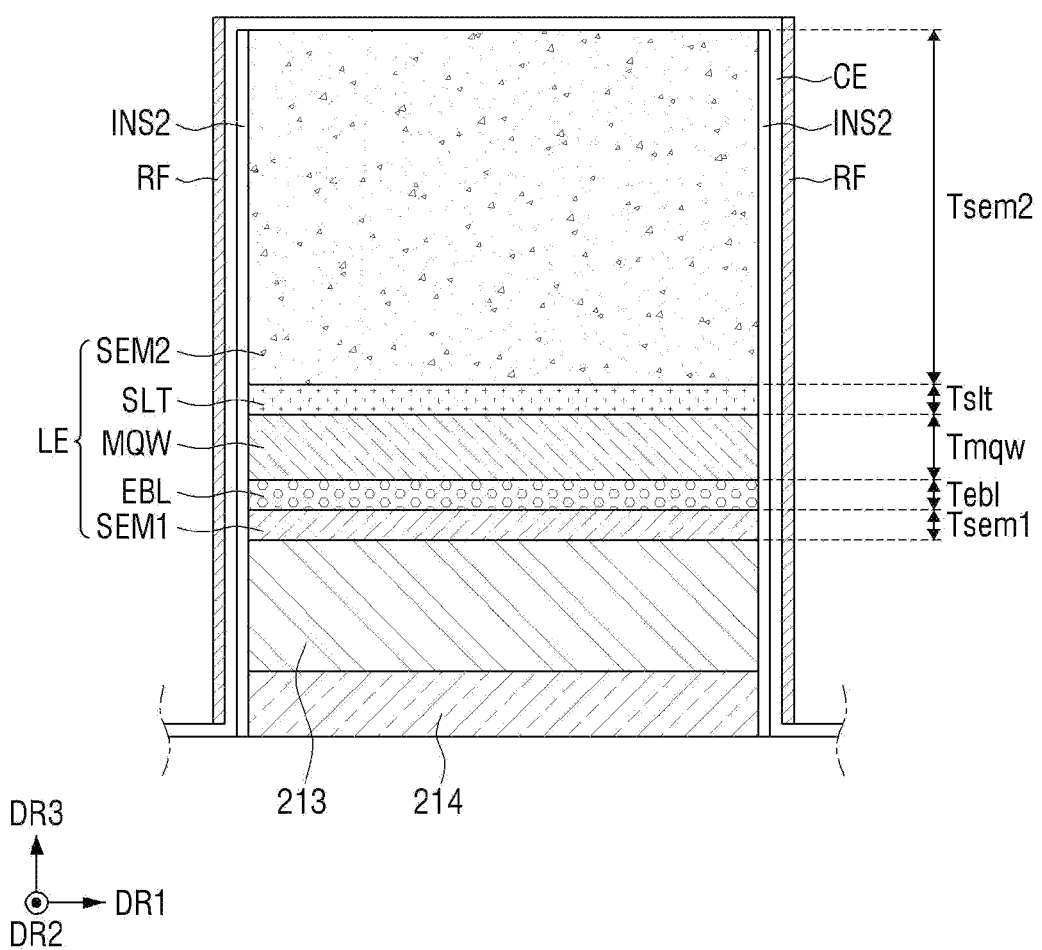
FIG. 12 is an enlarged schematic cross-sectional view showing in detail an example of the light-emitting elements of FIG. 11.

FIG. 11 is a schematic cross-sectional view showing an example of the image displayer, taken along line I-I' of FIG. 10. FIG. 12 is an enlarged schematic cross-sectional view showing in detail an example of the light-emitting elements of FIG. 11.

Referring to FIGS. 11 and 12, the display panel 212 may include the semiconductor circuit board 215, a conductive connection layer 216, and a light-emitting element layer 217.

The semiconductor circuit board 215 may include pixel circuits PXC and pixel electrodes 214. The conductive connection layer 216 may include connection electrodes 213, first pads PD1, a common connection electrode CCE, a first insulating layer INS1, and a conductive pattern 213R.

The semiconductor circuit board 215 may be a silicon wafer substrate formed via a semiconductor process. The plurality of pixel circuits PXC of the semiconductor circuit board 215 may be formed via a semiconductor process.

The pixel circuits PXC may be disposed in the display area DA (see FIG. 6). The pixel circuits PXC may be connected to the pixel electrodes 214, respectively. In other words, the pixel circuits PXC and the pixel electrodes 214 may be connected in a one-to-one correspondence. The pixel circuits PXC may overlap the light-emitting elements LE1 to LE4 in the third direction DR3, respectively. Each pixel circuit PXC may employ a variety of other modified pixel structures such as a 3T1C structure, a 2T1C structure, a 7T1C structure, and a 6T1C structure.

The pixel electrodes 214 may be disposed on the pixel circuits PXC, respectively. Each of the pixel electrodes 214 may be an exposed electrode exposed from the respective pixel circuit PXC. In other words, each of the pixel electrodes 214 may protrude from the upper surface of the respective pixel circuit PXC. The pixel electrodes 214 may be formed integrally with the pixel circuits PXC, respectively. Each of the pixel electrodes 214 may receive a pixel voltage or an anode voltage from the respective pixel circuit PXC. The pixel electrodes 214 may be made of aluminum (Al).

The connection electrodes 213 may be disposed on the pixel electrodes 214, respectively. Each of the connection electrodes 213 may be disposed on the pixel electrode 214. The connection electrodes 213 may include a metal material for attaching the pixel electrodes 214 to the light-emitting elements LE, respectively.

The common connection electrode CCE may be spaced apart from the pixel electrode 214 and the connection electrode 213. The common connection electrode CCE may be disposed to surround the pixel electrode 214 and the connection electrode 213. The common connection electrode CCE may be connected to one of the first pads PD1 of the first pad area PDA1 of the non-display area NDA to receive a common voltage. The common connection electrode CCE may include the same material as the connection electrodes 213.

The first insulating layer INS1 may be disposed on the common connection electrode CCE. The width of the first insulating layer INS1 in the first direction DR1 or the second direction DR2 may be smaller than the width of the common connection electrode CCE. Accordingly, a part of the upper surface of the common connection electrode CCE may not be covered by the first insulating layer INS1 but may be exposed. The part of the upper surface of the common connection electrode CCE that may not be covered by the first insulating layer INS1 but may be exposed may be in contact with the common electrode CE. Therefore, the common electrode CE may be connected to the common connection electrode CCE.

The conductive pattern 213R may be disposed on the first insulating layer INS1. The conductive pattern 213R may be disposed between the first insulating layer INS1 and the partition wall PW. The width of the conductive pattern 213R may be substantially equal to the width of the first insulating layer INS1 or the width of the partition wall PW. The conductive pattern 213R may be residues formed via the same process with the connection electrodes 213 and the common connection electrode CCE.

The light-emitting element layer 217 may include the light-emitting elements LE1, LE2, LE3 and LE4, the partition wall PW, a second insulating layer INS2, the common electrode CE, a reflective layer RF, a light-blocking BM, and optical patterns LP.

The light-emitting element layer 217 may include first to fourth emission areas EA1 to EA4 partitioned by the partition wall PW. At least one of the light-emitting elements LE and the optical patterns LP may be disposed in each of the first to fourth emission areas EA1 to EA4.

The light-emitting elements LE1, LE2 and LE3 of FIG. 12 may be disposed on the connection electrodes 213 in each of the emission areas EA1 to EA3. The length (or height) of each of the light-emitting elements LE1, LE2 and LE3 in the third direction DR3 may be longer than the length in the horizontal direction. The horizontal length refers to either the length in the first direction DR1 or the length in the second direction DR2. For example, the length of the first light-emitting element LE1 in the third direction DR3 may be approximately 1 μm to approximately 5 μm.

Referring to FIG. 12, each of the light-emitting elements LE1, LE2, LE3 and LE4 may include a first semiconductor layer SEM1, an electron blocking layer EBL, an active layer MQW, a superlattice layer SLT, and a second semiconductor layer SEM2. The first semiconductor layer SEM1, the electron blocking layer EBL, the active layer MQW, the superlattice layer SLT and the second semiconductor layer SEM2 may be stacked on one another in this order in the third direction DR3.

The first semiconductor layer SEM1 may be disposed on the connection electrode 213. The first semiconductor layer SEM1 may be a semiconductor layer doped with a dopant of a first conductivity type such as Mg, Zn, Ca, Se and Ba. For example, the first semiconductor layer 31 may be p-GaN doped with p-type Mg. The thickness of the first semiconductor layer SEM1 may range from approximate 30 to approximately 200 nm.

The electron blocking layer EBL may be disposed on the first semiconductor layer SEM1. The electron blocking layer EBL may suppress or prevent too many electrons from flowing into the active layer MQW. For example, the electron blocking layer EBL may be p-AlGaN doped with p-type Mg. The thickness of the electron blocking layer EBL may be approximately 10 to approximately 50 nm. The electron blocking layer EBL may be eliminated.

The active layer MQW may be divided into first to third active layers. Each of the first to third active layers may include a material having a single or multiple quantum well structure. In case that each of the first to third active layers includes the material having the multiple quantum well structure, well layers and barrier layers may be alternately stacked on one another in the structure. In this instance, the first active layer may include InGaN or GaAs, and the second active layer and the third active layer may include InGaN. It should be understood, however, that the disclosure is not limited thereto. The first active layer may emit light by combining electron-hole pairs according to an electrical signal. The first active layer may emit first light having a main peak wavelength in the range of approximately 600 nm to approximately 750 nm, i.e., light of the red wavelength range. The second active layer may emit light by combining electron-hole pairs according to an electrical signal. The second active layer may emit third light having a main peak wavelength in the range of approximately 480 nm to approximately 560 nm, i.e., light of the green wavelength range. The third active layer may emit light by combining electron-hole pairs according to an electrical signal. The third active layer may emit second light having a main peak wavelength in the range of approximately 370 nm to approximately 460 nm, i.e., light of the blue wavelength range.

The first to third active layers may emit lights of different colors depending on the contents of indium. For example, as the content of indium (In) decreases, the wavelength range of light output from each of the first to third active layers may move to the red wavelength range, and as the content of indium (In) increases, the wavelength range of the output light may move to the blue wavelength range. The content of indium (In) in the first active layer may be higher than the content of indium (In) in the second active layer, and the content of indium (In) in the second active layer may be higher than the content of indium (In) in the third active layer. For example, the content of indium (In) in the third active layer may be 15%, the content of indium (In) in the second active layer may be 25%, and the content of indium (In) in the first active layer may be 35% or more.

Since the color of emitted light may vary depending on the content of indium of each of the first to third active layers, the light-emitting element layer 217 of each of the light-emitting elements LE1, LE2 and LE3 may emit lights such as the first light, the second light and the third light equally or differently depending on the content of the indium. For example, if the content of indium (In) in the first to third active layers of the first light-emitting element LE1 may be below 15%, the first light of the red wavelength range having the main peak wavelength from approximately 600 nm to approximately 750 nm can be emitted. If the content of indium (In) in the first to third active layers of the second light-emitting element LE2 may be equal to 25%, the second light of the green wavelength range having the main peak wavelength from approximately 480 nm to 560 nm can be emitted. If the content of indium (In) in the first to third active layers of the third light-emitting element LE3 may be above 35%, the third light of the blue wavelength range having the main peak wavelength from approximately 370 nm to approximately 460 nm can be emitted. By adjusting and setting the contents of indium (In) in the first to third active layers of the fourth light-emitting element LE4, the fourth light-emitting element LE4 may emit the first to third lights, too, or may emit another fourth light.

The superlattice layer SLT may be disposed on the active layer MQW. The superlattice layer SLT may relieve stress between the second semiconductor layer SEM2 and the active layer MQW. For example, the superlattice layer SLT may be made of InGaN or GaN. The thickness of the superlattice layer SLT may be approximately 50 to approximately 200 nm. The superlattice layer SLT may be eliminated.

The second semiconductor layer SEM2 may be disposed on the superlattice layer SLT. The second semiconductor layer SEM2 may be doped with a dopant of a second conductivity type such as Si, Ge and Sn. For example, the second semiconductor layer SEM2 may be n-GaN doped with n-type Si. The thickness of the second semiconductor layer SEM2 may range from approximately 2 to approximately 4 μm.

The partition wall PW may be spaced apart from the light-emitting elements LE1 to LE4 disposed in the first to fourth emission areas EA1 to EA4, respectively. The partition wall PW may surround the light-emitting elements LE1 to LE4 disposed in the first to fourth emission areas EA1 to EA4, respectively.

The partition wall PW may be disposed on the common connection electrode CCE. The width of the partition wall PW in the first direction DR1 and the second direction DR2 may be smaller than the width of the common connection electrode CCE. The partition wall PW may be spaced apart from the light-emitting elements LE.

The partition wall PW may include a first partition wall PW1, a second partition wall PW2 and a third partition wall PW3. The first partition wall PW1 may be disposed on the first insulating layer INS1. Since the first partition wall PW1 may be formed via the same process with the light-emitting element LE, at least a part of the first partition wall PW1 may include the same material as that of the light-emitting element LE.

The second insulating layer INS2 may be disposed on the side surfaces of the common connection electrode CCE, the side surfaces of the partition wall PW, the side surfaces of each of the pixel electrodes 214, the side surfaces of each of the connection electrodes 213, and the side surfaces of each of light-emitting elements LE1 to LE4. The second insulating layer INS2 may be implemented as an inorganic layer such as a silicon oxide layer ($SiO_2$). The thickness of the second insulating layer INS2 may be approximately 0.1 μm.

The common electrode CE may be disposed on the upper and side surfaces of each of the light-emitting elements LE1 to LE4, and the upper and side surfaces of the partition wall PW. For example, the common electrode CE may be disposed to cover the upper and side surfaces of each of the light-emitting elements LE1 to LE4 and the upper and side surfaces of the partition wall PW.

The common electrode CE may be in contact with the second insulating layer INS2 disposed on the side surfaces of the common connection electrode CCE, the side surfaces of the partition wall PW, the side surfaces of each of the pixel electrodes 214, the side surfaces of each of the connection electrodes 213, and the side surfaces of each of light-emitting elements LE1 to LE4. The common electrode CE may be in contact with the upper surface of the common connection electrode CCE, the upper surface of each of the light-emitting elements LE1 to LE4, and the upper surface of the partition wall PW.

The common electrode CE may be in contact with the upper surface of the common connection electrode CCE and the upper surfaces of the light-emitting elements LE1 to LE4 that are not covered by the second insulating layer INS2. Therefore, the common voltage supplied to the common connection electrode CCE may be applied to the light-emitting elements LE1 to LE4. For example, a first end of each of the light-emitting elements LE1 to LE4 may receive the pixel voltage or the anode voltage of the pixel electrode 213 through the connection electrode 214, and a second end thereof may receive the common voltage through the common electrode CE. The light-emitting element LE may emit light with a predetermined luminance according to a voltage difference between the pixel voltage and the common voltage.

The reflective layer RF may be disposed on side surfaces of the common connection electrode CCE, side surfaces of the partition wall PW, side surfaces of each of the pixel electrodes 214, side surfaces of each of the connection electrodes 213, and side surfaces of each of light-emitting elements LE1 to LE4. The reflective layer RF serves to reflect some of the lights emitted from the light-emitting elements LE1 to LE4 which travel in other directions than the vertical direction. The reflective layer RF may include a metal material having high reflectivity, such as aluminum (Al). The thickness of the reflective layer RF may be approximately 0.1 μm.

A base resin BRS may be disposed on a protective layer PTF in each of the light-emitting elements LE1 to LE4. The base resin BRS may include a transparent organic material. The base resin BRS may further include scattering particles for scattering the light of the light-emitting elements LE1 to LE4 in random directions. The scattering particles may include metal oxide particles or organic particles.

The light-blocking member BM may be disposed on the partition wall PW. The light-blocking member BM may include a light-blocking material. The light-blocking member BM may be disposed between adjacent ones of the emission areas EA1, EA2, EA3 and EA4, and can prevent color mixing between lights in different wavelength ranges emitted from the light-emitting elements LE1 to LE4 of the emission areas EA1, EA2, EA3 and EA4. The light-blocking member BM may absorb at least a part of external light incident from the outside on the light-emitting element layer 217 to reduce reflection of the external light. The light-blocking member BM may be disposed on the partition wall PW, and may be further extended to the emission areas EA1, EA2, EA3 and EA4. For example, the width of the light-blocking member BM may be greater than the width of the partition wall PW.

The optical patterns LP may be selectively disposed on the emission areas EA1, EA2, EA3 and EA4. The optical patterns LP may be disposed directly on the base resins BRS of the emission areas EA1, EA2, EA3 and EA4, respectively. The optical patterns LP may have a shape that protrudes upward (e.g., toward each optical pattern LP from the light-emitting elements LE1 to LE4). For example, the cross-sectional shape of each of the optical patterns LP may include a lens shape that may be convex upward. Each of the optical patterns LP may be disposed on the base resin BRS thereunder and the light-blocking member BM. The width of the optical patterns LP may be equal to, greater than, or smaller than the width of the emission areas EA1, EA2, EA3 and EA4. The optical patterns LP may condense the first to third lights or the fourth light transmitted the base resins BRS in the emission areas EA1, EA2, EA3 and EA4.

Figure 13:
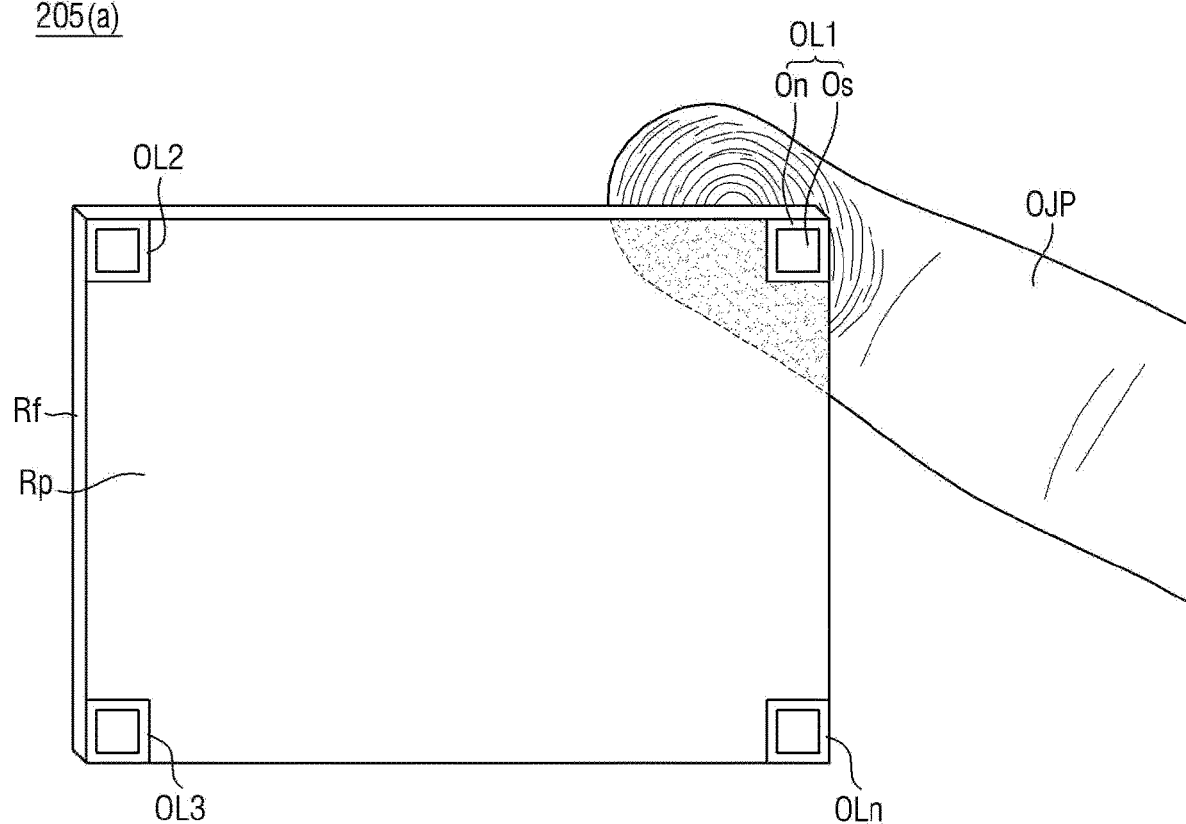
FIG. 13 is a schematic view showing in detail a touch sensing structure of the first reflective member formed in the optical module of FIG. 6.

FIG. 13 is a schematic view showing in detail a touch sensing structure of the first reflective member formed in the optical module of FIG. 6.

As described above, the display light for the augmented reality contents image MI displayed in the first display module 210(a) and reflected by the first reflective member 205(a) may be provided to the second reflective member 205(b) along the reflection angle of the first reflective member 205(a). The display light for the augmented reality contents image MI reflected by the second reflective member 205(b) may be provided to the first optical panel 207 of the transparent lens 201 along the reflection angle of the second reflective member 205(b). To this end, as shown in FIG. 13, the first and second reflective members 205(a) and 205(b) in the shape of a flat plate Rf may have a reflective surface Rp made of a reflective material so that incident light can be reflected.

The exterior of the first optical module 205 on which the first reflective member 205(a) may be disposed may be utilized as a touch surface working as a user interface. As shown in FIG. 13, in case that a user's finger OJP or a writing tool is brought into touch with the rear surface or the exterior of the first reflective member 205(a), the amount of the light may be reduced at the position where the finger OJP or writing tool may be brought into touch. Accordingly, as the amount of light at the touch position decreases, the amount of light reflected from the first reflective member 205(a) to the second reflective member 205(b) may also decrease.

The first reflective member 205(a) includes first light-receiving sensing units OL1 to OLn as the elements for detecting changes in the amount of light in the vicinity and the amount of incident light. Accordingly, in case that a finger OJP or a writing tool is brought into touch with a position corresponding to at least one of the plurality of first light-receiving sensing units OL1 to OLn, the amount of light in the vicinity of the touched light-receiving sensing unit decreases. The light at the touch position may be diffusely reflected due to the structure of the light-receiving sensing unit, and thus the amount of light at the touch position may be further lost. As a result, a dark spot may be generated at some regions of the reflective surface of the first reflective member 205(a) which may correspond to the touch position. The amount of light at regions of the first reflective member 205(a) where the amount of the light may be lost or a dark spot may be generated may be directly transmitted to the second reflective member 205(b). As a result, such regions may be displayed as dark on the augmented reality contents image MI perceived by the user's eyes through the transparent lens 201. In this manner, the user can intuitively see if the touch is made and if the touch is recognized normally.

On the other hand, sensing results may be displayed so that the user can see the sensing results by sensing if a touch is made. To this end, each of the first light-receiving sensing units OL1 to OLn may generate a light amount detection signal corresponding to a change in the amount of light incident from the first display module 210(a) and a change in the amount of light in the vicinity to supply it to the control module 220.

The first light-receiving sensing units OL1 to OLn may be disposed on the reflective surface Rp of the first reflective member 205(a), and may be disposed at some of the border areas of the reflective surface Rp including the corners of the reflective surface Rp.

Each of the first light-receiving sensing units OL1 to OLn includes a groove On of a predetermined depth formed in the reflective surface Rp of the first reflection member 205(a), and at least one light-receiving sensor Os disposed in the groove On such that it faces the front side of the reflective surface Rp. Accordingly, each of the light-receiving sensors Os included in the first light-receiving sensing units OL1 to OLn may supply a light amount detection signal corresponding to a change in the amount of light in the vicinity and a change in the amount of incident light to the control module 220.

As shown in FIG. 13, a user's finger OJP or a writing tool may be brought into touch with the rear surface or the vicinity of one of the first light-receiving sensing units OL1 to OLn, for example, the first light-receiving sensing unit OL1, the amount of light in the vicinity of the first light-receiving sensing unit OL1 decreases. As a result, the amount of light sensed by the first light-receiving sensing unit OL1 may decrease because the amount of the light in the vicinity decreases. The control module 220 may receive the light amount detection signals in real time from the light-receiving sensors Os included in the light-receiving sensing units OL1 to OLn, respectively. The control module 220 may compare the average value of the light amount detection signals with the magnitude value of the light amount detection signals of the light-receiving sensors Os at least at every frame. The first light-receiving sensing unit OL1 outputting a light amount detection signal having a lower magnitude than the average value by a predetermined reference difference value may be selected out. The control module 220 may determine that the user's touch is made in the vicinity of the selected first light-receiving sensing unit.

Figure 14:
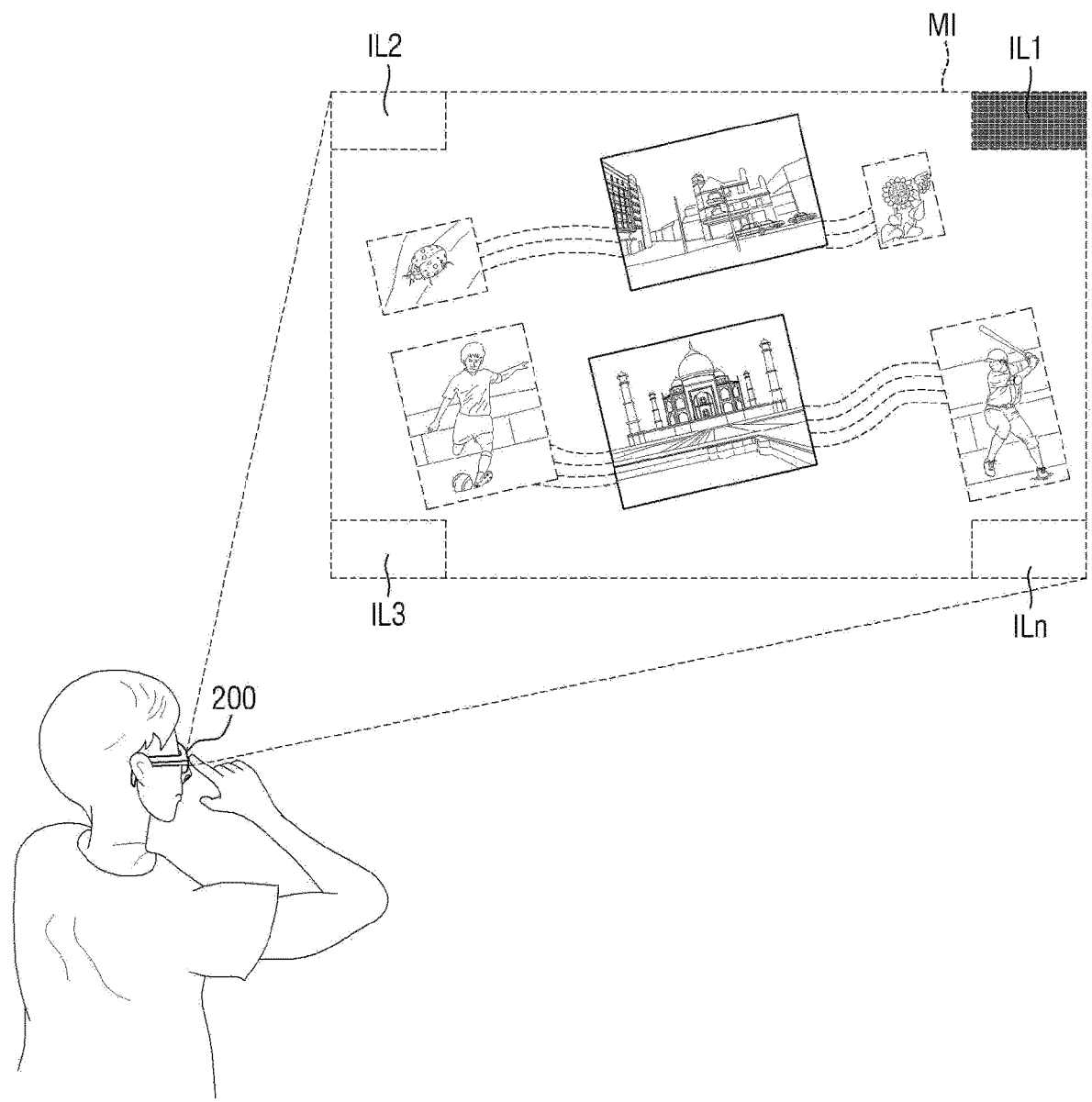
FIG. 14 is a schematic view showing an example of a user's touch sensing regions indicated on an augmented reality contents image.

FIG. 14 is a schematic view showing an example of a user's touch sensing regions indicated on an augmented reality contents image.

Referring to FIG. 14 in conjunction with FIGS. 7 and 8, touch sensing display regions IL1 to ILn corresponding to the light-receiving sensor forming regions of the first reflective member 205(a), respectively, may be defined in the image displayer 110. Accordingly, the control module 220 may compare the magnitude value of the light amount detection signal received from each of the light-receiving sensors Os with the average value to select out at least one light-receiving sensing unit on which the user's touch has been made. For example, the control module 220 may determine that the user's touch is made in the vicinity of the selected first light-receiving sensing unit OL1.

As shown in FIG. 14, in case that a user's touch is detected, the control module 220 may modulate the image data of the sensing display regions IL1 to ILn corresponding to the light-receiving sensor forming regions. For example, the control module 220 may modulate image data of the first touch sensing display region IL1 among the touch sensing display regions IL1 to ILn according to the user's touch position into grayscale image data, so that the first touch sensing display region IL1 can be displayed in black. At this time, the control module 220 may activate the user interface function. In case that the interface function is activated, the control module 220 may control the operation of displaying the augmented reality contents, such as adjusting the volume of audio or adjusting the brightness of an image according to the user's touch position. The control module 220 may modulate the position of an object on the augmented reality contents image according to the user's touch position, or may modulate the display colors of the augmented reality contents image by image data modulation. The control module 220 may control the sensing operation of the sensing module 240.

Figure 15:
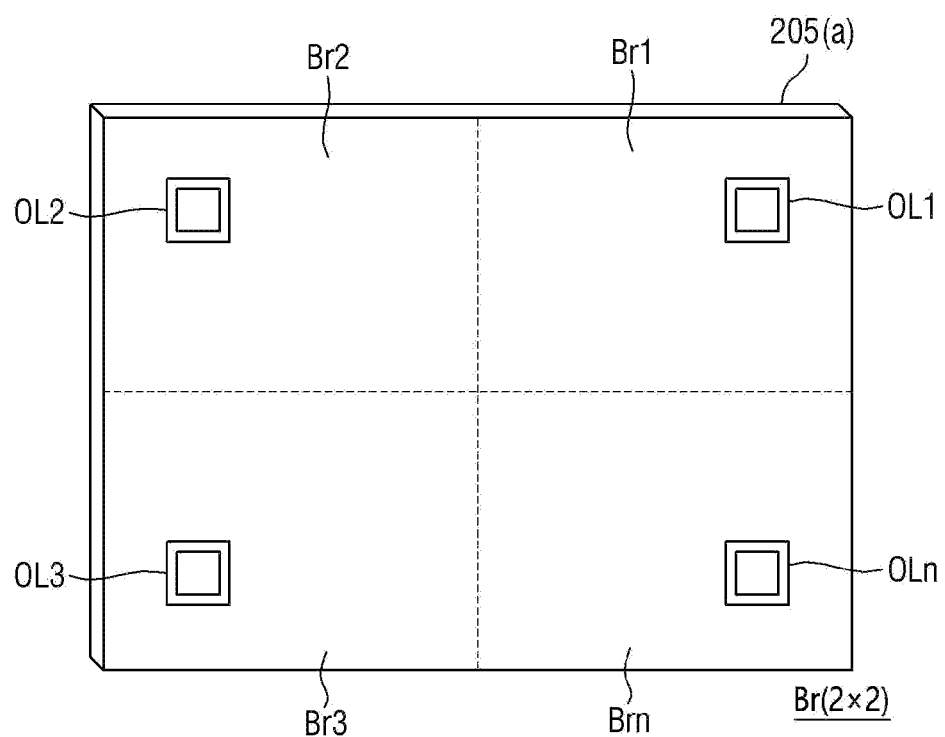
FIG. 15 is a schematic view showing another example of the touch sensing structure of the first reflective member shown in FIG. 13.

FIG. 15 is a schematic view showing another example of the touch sensing structure of the first reflective member shown in FIG. 13.

Referring to FIG. 15, the reflective surface Rp of the first reflective member 205(a) may be divided into predetermined regions Br1 to Brn, for example, 2×2 blocks.

The first light-receiving sensing units OL1 to OLn may be formed in a plurality of predetermined regions Br1 to Brn, respectively, and may be formed at the corners of the regions Br1 to Brn or at predetermined border areas of the regions Br1 to Brn. Although the first light-receiving sensing units OL1 to OLn may be formed at the center of the regions Br1 to Brn, it may be desired that they are formed at the corners of the regions Br1 to Brn in order not to decrease the efficiency of reflecting the display light for the augmented reality contents image.

The first light-receiving sensing units OL1 to OLn in the regions Br1 to Brn may supply light amount detection signals corresponding to a change in the amount of light incident from the first display module 210(a) and a change in the amount of light in the vicinity to the control module 220.

Figure 16:
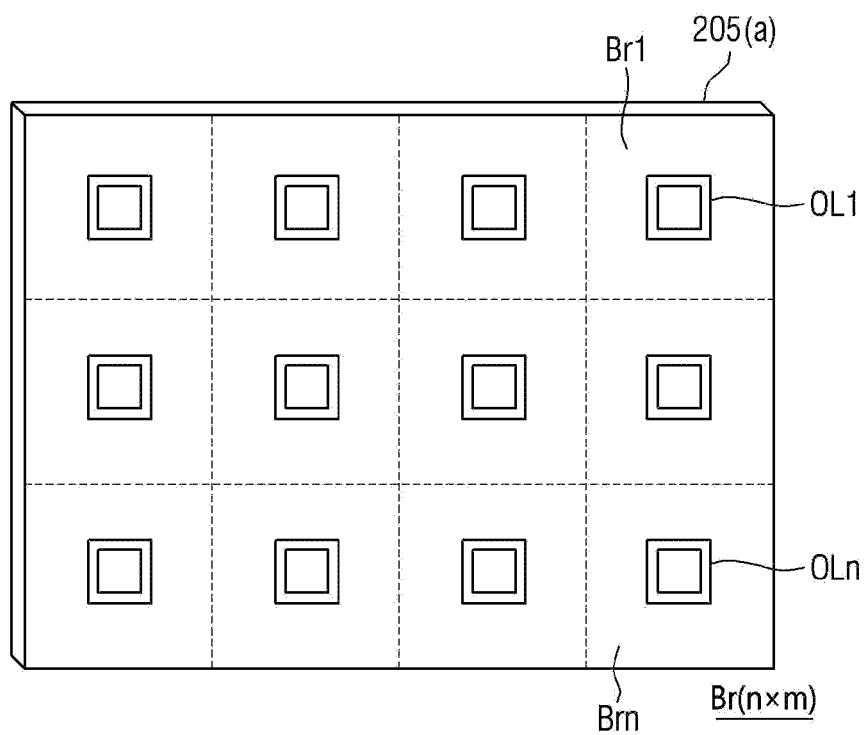
FIG. 16 is a schematic view showing yet another example of the touch sensing structure of the first reflective member shown in FIG. 13.

FIG. 16 is a schematic view showing yet another example of the touch sensing structure of the first reflective member shown in FIG. 13.

Referring to FIG. 16, the reflective surface Rp of the first reflective member 205(a) may be divided into predetermined regions Br1 to Brn of n×m blocks, where n and m may be natural numbers equal to or greater than two.

The first light-receiving sensing units OL1 to OLn may be formed in the regions Br1 to Brn of n×m blocks, respectively, and may be formed at the centers of the regions Br1 to Brn. As the number of n×m blocks increases, the border areas in the regions Br1 to Brn of the n×m block may have no positional meaning. Therefore, the first light-receiving sensing units OL1 to OLn may be respectively formed at the centers of the regions Br1 to Brn.

The first light-receiving sensing units OL1 to OLn respectively formed in the regions Br1 to Brn of the n×m block may supply light amount detection signals corresponding to a change in the amount of light incident from the first display module 210(a) in the regions Br1 to Brn and a change in the amount of light in the vicinity to the control module 220.

Figure 17:
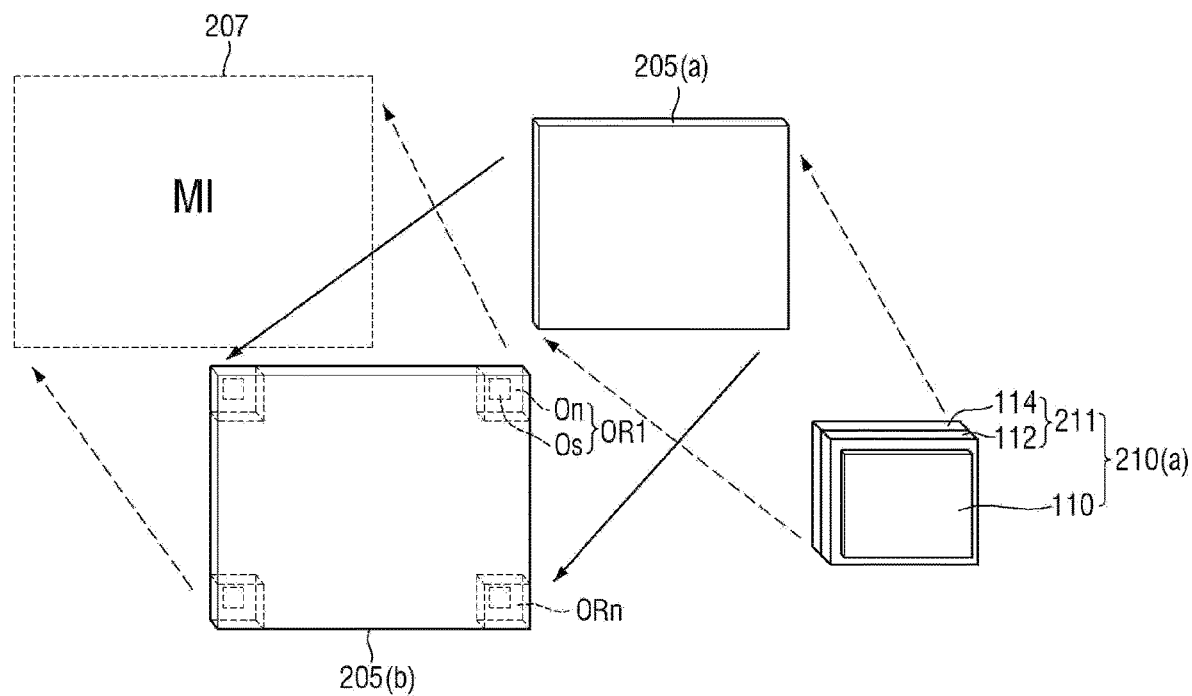
FIG. 17 is a schematic view showing another example of a structure in which the optical module forms paths of the display lights for the augmented reality contents image displayed in the first display module shown in FIG. 5.

FIG. 17 is a schematic view showing another example of a structure in which the optical module may form paths of the display lights for the augmented reality contents image displayed in the first display module shown in FIG. 5.

Specifically, FIG. 17 shows the structure of the first optical module 205 for forming light paths in which the display light for the augmented reality contents image MI displayed in the first display module 210(a) may be sequentially reflected by the first and second reflective members 205(a) and 205(b) and may be supplied to the first optical panel 207 of the transparent lens 201.

The display light for the augmented reality contents image MI reflected by the first reflective member 205(b) may be reflected again by the second reflective member 205(b) to be provided to the first optical panel 207 of the transparent lens 201 along the reflection angle of the second reflective member 205(b).

The exterior of the second reflective member 205(b) may be utilized as a touch surface working as a user interface. In case that a user's finger or a writing tool is brought into touch with the exterior of the second reflective member 205(b) such as the front surface and the rear surface, the amount of light in the vicinity of the second reflective member 205(b) may decrease. As the amount of light in the vicinity decreases, the amount of light sensed by the second reflective member 205(b) may also decrease.

The second reflective member 205(b) may include a plurality of second light-receiving sensing units OR1 to ORn as elements for detecting a change in the amount of light in the vicinity and a change in the amount of light incident from the first reflective member 205(a). Each of the second light-receiving sensing units OR1 to ORn may generate a light amount detection signal corresponding to a change in the amount of light reflected by the first reflective member 205(a) and a change in the amount of light in the vicinity to supply it to the control module 220.

The second light-receiving sensing units OR1 to ORn may be disposed on the reflective surface Rp of the second reflective member 205(b), and may be disposed at some of the border areas of the reflective surface including the corners of the reflective surface. Each of the second light-receiving sensing units OR1 to ORn includes may include groove On of a predetermined depth formed in the reflective surface of the second reflection member 205(b), and at least one light-receiving sensor Os disposed in the groove On such that it faces the front side of the reflective surface. Accordingly, each of the light-receiving sensors Os included in the second light-receiving sensing units OR1 to ORn supplies a light amount detection signal corresponding to a change in the amount of light incident from the first reflective member 205(a) and a change in the amount of light in the vicinity to the control module 220.

The control module 220 may receive the light amount detection signals in real time from the light-receiving sensors Os included in the second light-receiving sensing units OR1 to ORn, respectively. The control module 220 may compare the average value of the light amount detection signals with the magnitude value of the light amount detection signals of the light-receiving sensors Os at least at every frame. Accordingly, the control module 220 may determine that the user's touch is made in the vicinity of the light-receiving sensor Os that has output the light amount detection signal having a lower magnitude than the average value by the reference difference value.

Figure 18:
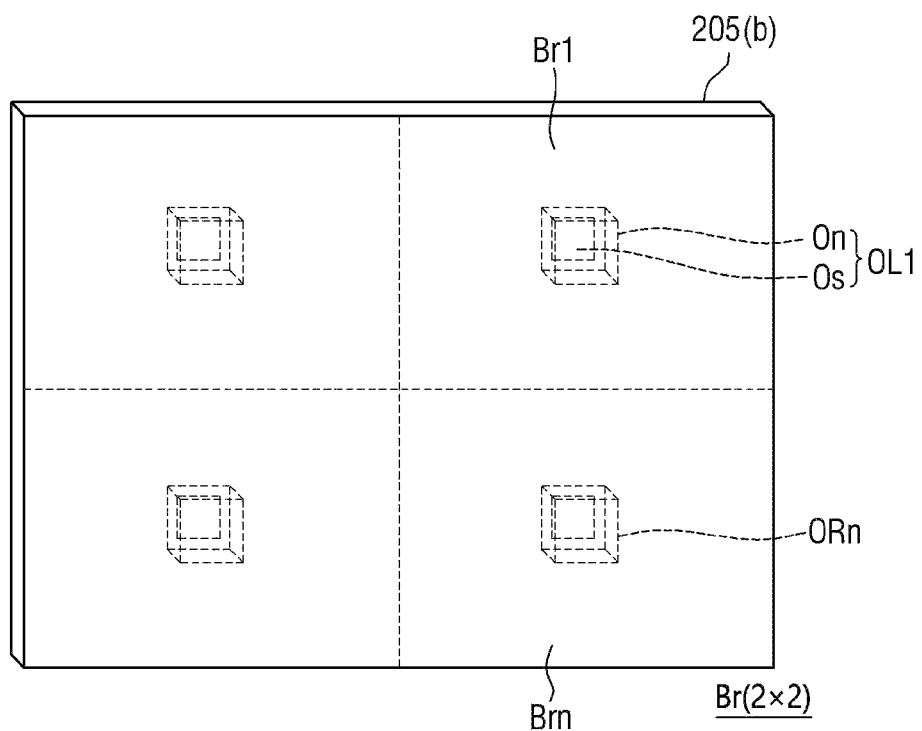
FIG. 18 is a schematic view showing another example of the touch sensing structure of the second reflective member shown in FIG. 17.

FIG. 18 is a schematic view showing another example of the touch sensing structure of the second reflective member shown in FIG. 17.

Referring to FIG. 18, the reflective surface of the second reflective member 205(b) may be divided into predetermined regions Br1 to Brn, for example, 2×2 blocks.

The second light-receiving sensing units OR1 to ORn may be formed in a plurality of predetermined regions Br1 to Brn, respectively, and may be formed at the corners of the regions Br1 to Brn or at predetermined border areas of the regions Br1 to Brn. It may be desired that the second light-receiving sensing units OR1 to ORn are formed at the corners and the border areas of the regions Br1 to Brn so that the efficiency of reflecting display light for the augmented reality contents image may not be deteriorated.

The second light-receiving sensing units OR1 to ORn in the regions Br1 to Brn may supply light amount detection signals corresponding to a change in the amount of light incident from the first reflective member 205(a) and a change in the amount of light in the vicinity to the control module 220.

Figure 19:
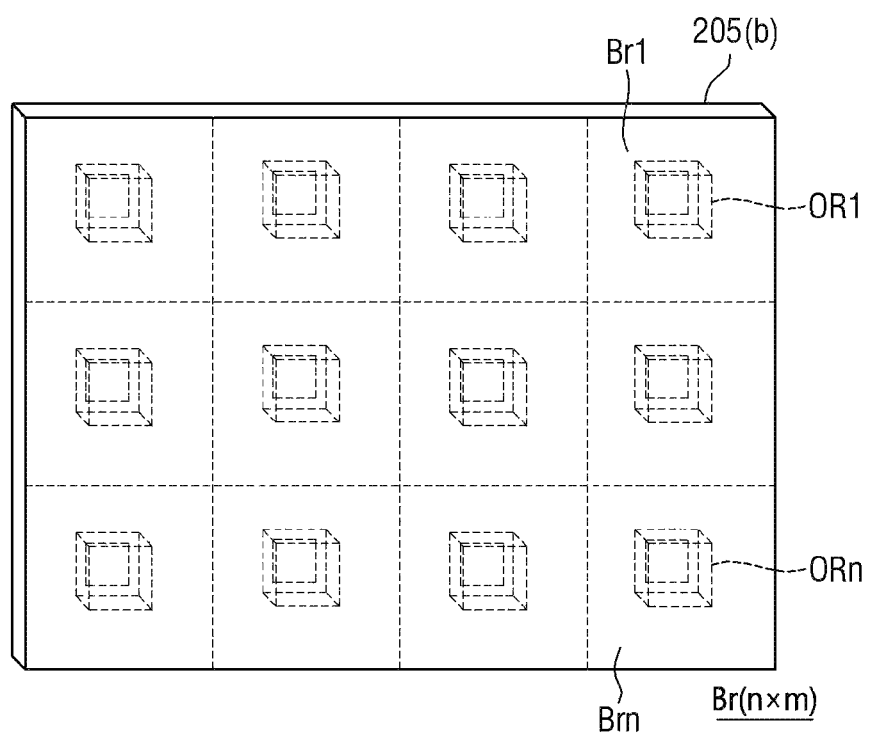
FIG. 19 is a schematic view showing yet another example of the touch sensing structure of the second reflective member shown in FIG. 17.

FIG. 19 is a schematic view showing yet another example of the touch sensing structure of the second reflective member shown in FIG. 17.

Referring to FIG. 19, the reflective surface of the second reflective member 205(b) may be divided into predetermined regions Br1 to Brn of n×m blocks. where n and m are natural numbers equal to or greater than two.

The second light-receiving sensing units OR1 to ORn may be formed in the regions Br1 to Brn of n×m blocks, respectively, and may be formed at the centers of the regions Br1 to Brn. As the number of n×m blocks increases, the border areas in the regions Br1 to Brn of the n×m block may have no positional meaning. Therefore, the second light-receiving sensing units OR1 to ORn may be respectively formed at the centers of the regions Br1 to Brn.

The second light-receiving sensing units OR1 to ORn respectively formed in the regions Br1 to Brn of the n×m block may supply light amount detection signals corresponding to a change in the amount of light incident from the first reflective member 205(*a*) in the regions Br1 to Brn and a change in the amount of light in the vicinity to the control module 220.

As described above, the display device for providing augmented reality contents 200 according to an embodiment of the disclosure may sense a user's touch on the paths of the display light for the augmented reality contents image MI. The amount of the light may decrease at the region touched by the user, i.e., on the point on the path of the light touched by the user. Accordingly, the touch sensing state on the path of the display light for the augmented reality contents image MI may be displayed in dark on the augmented reality contents image MI in real time.

Figure 20:
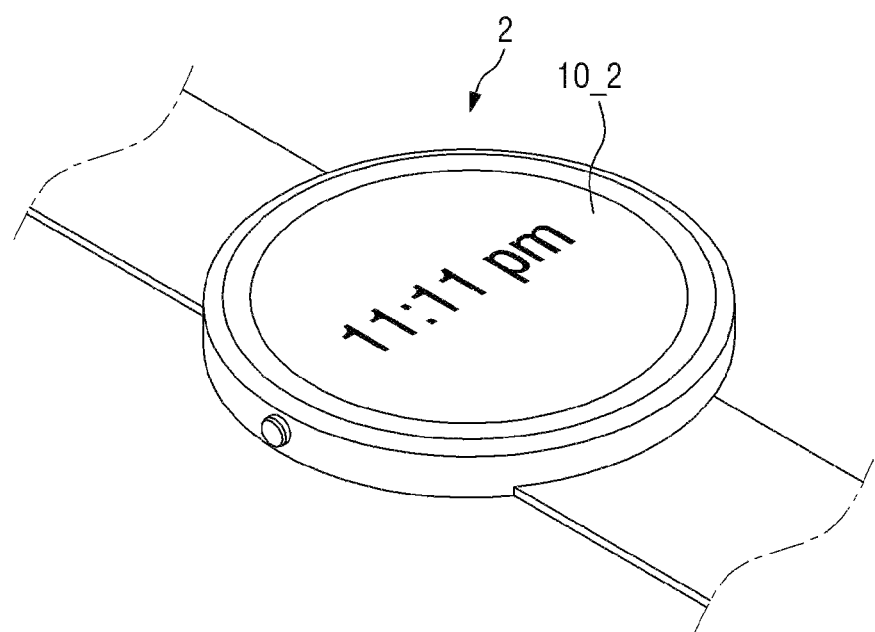
FIG. 20 is a schematic view showing an example of a watch-type smart device including a display module according to an embodiment of the disclosure.

FIG. 20 is a schematic view showing an example of a watch-type smart device including a display module according to an embodiment of the disclosure.

Referring to FIG. 20, the image displayer 110 included in the display device for providing augmented reality contents 200 may be applied to the watch-type smart device 2 which is a kind of smart device. The watch-type smart device 2 according to an embodiment of the disclosure may be applied to a head mounted display including a band that can be worn on the head. For example, the watch-type smart device 2 is not limited to that shown in FIG. 20 but may be applied in a variety of electronic devices in a variety of forms.

Figure 21:
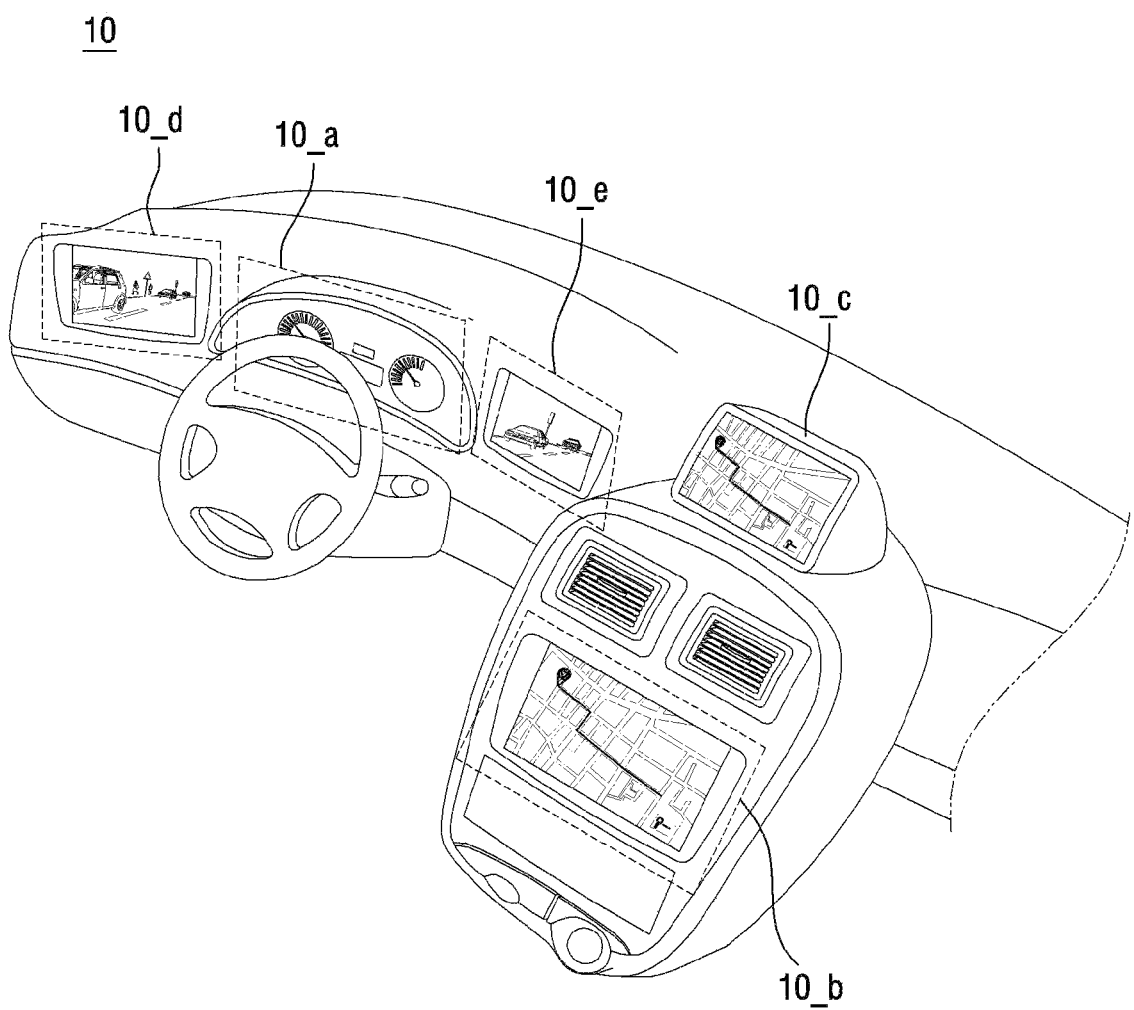
FIG. 21 is a schematic view showing an example of an instrument cluster and a center fascia for a vehicle which include display modules according to an embodiment of the disclosure.

FIG. 21 is a schematic view showing an example of an instrument cluster and a center fascia for a vehicle which include display modules according to an embodiment of the disclosure.

Referring to FIG. 21, the image displayer 110 including the device for providing augmented reality contents 200 may be applied to the instrument cluster 10_*a* of a vehicle, may be applied to the center fascia 10_*b* of a vehicle, or may be applied to a center information display (CID) 10_*d* and 10_*e* disposed on the dashboard of a vehicle. The image displayer 110 according to an embodiment of the disclosure may be applied to room mirror displays 10_*d* and 10_*e*, which can replace side mirrors of a vehicle, a navigation device, etc.

Figure 22:
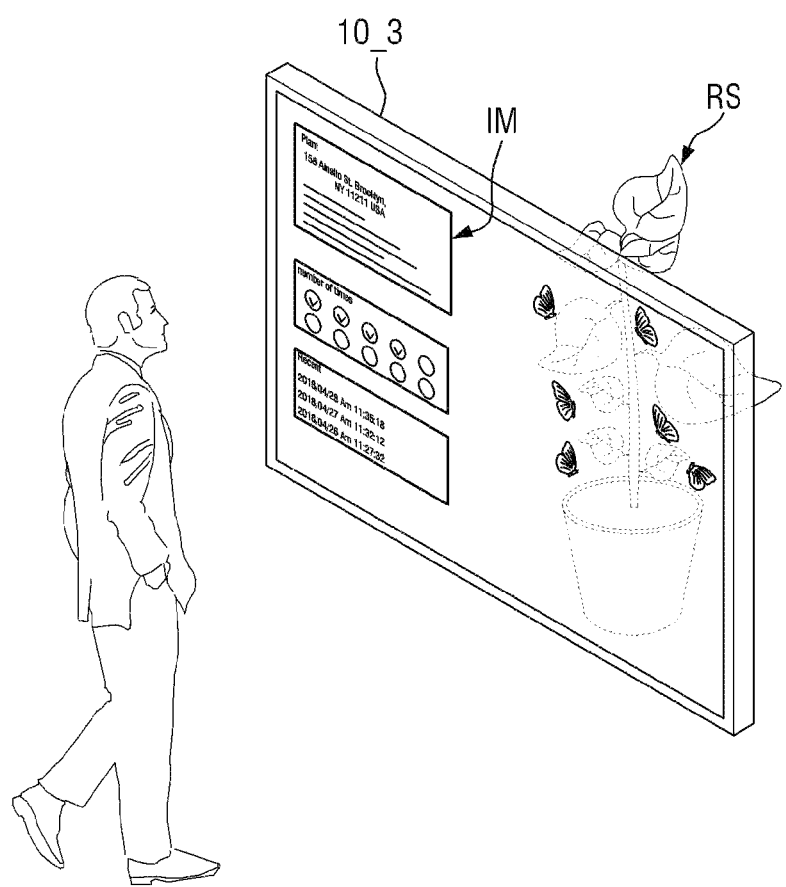
FIG. 22 is a schematic view showing an example of a transparent display device including a display module according to an embodiment of the disclosure.

FIG. 22 is a schematic view showing an example of a transparent display device including a display module according to an embodiment of the disclosure.

Referring to FIG. 22, the image displayer 110 included in the device for providing augmented reality contents 200 may be applied to a transparent display device. The transparent display device may transmit light while displaying images IM. Therefore, a user located on the front side of the transparent display device can not only watch the images IM displayed on the image displayer 110 but also watch an object RS or the background located on the rear side of the transparent display device. In case that the image displayer 110 is applied to the transparent display device, the display panel 212 of the image displayer 110 may include a light-transmitting portion that can transmit light or may be made of a material that can transmit light.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A display device comprising:
   a display part that outputs display light for displaying an image;
   an optical part that forms a path of the display light so that the image is displayed on a transparent lens, and senses a change in an amount of light on the path of the display light caused by a user's touch to output light amount detection signals; and
   a controller that analyzes changes in magnitudes of the light amount detection signals to sense the user's touch, controls driving of the display part so that the sensing results on the user's touch is displayed on the image, and activates a user interface function based on sensing results.

2. The device of claim 1, wherein
   the optical part comprises a first reflective member that reflects the display light for the image displayed in the display part to supply the display light to the transparent lens, and
   a rear surface or an exterior of the first reflective member is used as a touch surface to generate and output the light amount detection signal so that the light amount detection signal corresponds to the amount of light in vicinity that varies according to the user's touch.

3. The device of claim 2, wherein the first reflective member comprises a plurality of first light-receiving sensing parts that generate the light amount detection signal having magnitude varying according to a change in the amount of light incident from the display part and a change in the amount of light in the vicinity to output the light amount detection signal.

4. The device of claim 3, wherein the first light-receiving sensing parts are disposed on a reflective surface of the first reflective member and are disposed at part of border areas of the reflective surface comprising corners of the reflective surface.

5. The display device of claim 3, wherein
   each of the plurality of first light-receiving sensing parts comprises:
      a groove having a depth and formed in the reflective surface of the first reflective member; and
      at least one light-receiving sensor disposed in the groove such that the at least one light-receiving sensor faces a front side of the reflective surface, and
   the at least one light-receiving sensor supplies the light amount detection signal having a magnitude varying according to a change in the amount of light in vicinity and a change in the amount of incident light to the controller.

6. The device of claim 3, wherein
   the reflective surface of the first reflective member that reflects the display light is divided into regions of num blocks, n and m being natural numbers equal to or greater than two, and
   the first light-receiving sensing parts are formed at corners or some of border areas of the regions of the n×m blocks.

7. The device of claim 3, wherein
   the controller controls an image display operation of the display part and a sensing operation of the sensing module pursuant to the user's touch as the user interface function is activated.

8. The display device of claim 7, wherein the controller:
   compares an average value of the light amount detection signals with a magnitude value of each of the light amount detection signals at least at every frame;
   selects out at least one first light-receiving sensing part that outputs a light amount detection signal of a lower magnitude value than the average value of the light amount detection signals by a reference difference value; and determines that the user's touch is made in vicinity of the selected at least one first light-receiving sensing part and modulate data for displaying the image.

9. The device of claim 1, wherein
the optical part comprises:
 a first reflective member that reflects the display light for the image displayed in the display part; and
 a second reflective member that reflects again the display light reflected from the first reflective member to supply the display light to the transparent lens, and
a rear surface or an exterior of the second reflective member is used as a touch surface to generate and output the light amount detection signal so that the light amount detection signal corresponds to the amount of light in vicinity that varies according to the user's touch.

10. The device of claim 9, wherein the second reflective member comprises a plurality of second light-receiving sensing parts that generate the light amount detection signal having magnitude varying according to a change in the amount of light incident from the display part and a change in the amount of light in the vicinity to output the light amount detection signal.

11. The device of claim 10, wherein the second light-receiving sensing parts are disposed on a reflective surface of the second reflective member and are disposed at part of border areas of the reflective surface comprising corners of the reflective surface.

12. The display device of claim 10, wherein
each of the plurality of second light-receiving sensing parts comprises:
 a groove having a depth and formed in the reflective surface of the second reflective member; and
 at least one light-receiving sensor disposed in the groove such that the at least one light-receiving sensor faces a front side of the reflective surface, and
the at least one light-receiving sensor supplies the light amount detection signal having a magnitude varying according to a change in the amount of light in vicinity and a change in the amount of incident light to the controller.

13. The device of claim 10, wherein
the reflective surface of the second reflective member that reflects the display light is divided into regions of num blocks, n and m being natural numbers equal to or greater than two, and
the second light-receiving sensing parts are formed at corners or part of border areas of the regions of the n×m blocks.

14. The device of claim 10, wherein
the controller controls driving of the display part so that the sensing results on the user's touch is displayed on the augmented reality content image, and
the controller controls an image display operation of the display part and a sensing operation of the sensing module pursuant to the user's touch as the user interface function is activated.

15. The device of claim 1, wherein
the display part is assembled on a side or two sides of a support frame for supporting the transparent lens or integral with the support frame, and
the display part displays the augmented reality content image using at least one image displayer.

16. The device of claim 15, wherein the at least one image displayer comprises:
 a bank partitioned and arranged in a Pentile™ matrix on a substrate;
 light-emitting elements respectively disposed in emission areas arranged in the Pentile™ matrix by partitions of the bank and extended in a thickness direction of the substrate;
 a base resin formed in the emission areas comprising the light-emitting elements; and
 optical patterns selectively disposed on at least one of the emission areas.

17. The device of claim 16, wherein the emission areas are formed such that first to third emission areas or first to fourth emission areas are arranged in the Pentile™ matrix in each pixel area.

18. The device of claim 17, wherein
the first emission area comprises a first light-emitting element that emits a first light having a wavelength range producing one of red, green, and blue colors,
the second emission area comprises a second light-emitting element that emits a second light having a wavelength range producing one of red, green and blue colors which is different from the first light,
the third emission area comprises a third light-emitting element that emits a third light having a wavelength range producing one of red, green and blue colors which is different from the first light and the second light, and
the fourth emission area comprises a fourth light-emitting element that emits a fourth light, the fourth light and one of the first to third lights having a same wavelength range.

19. The device of claim 17, wherein
the first to fourth emission areas have a same size or area in a plan view, and
a distance between the first emission area and the second emission area, a distance between the second emission area and the third emission area, and a distance between the first emission area and the third emission area, and a distance between the third emission area and the fourth emission area, which are adjacent to each other in a horizontal or diagonal direction, are equal in case that the sizes or areas of the first to fourth emission areas are equal.

20. The device of claim 17, wherein
the first to fourth emission areas selectively have different sizes or areas in a plan view, and
a distance between the first emission area and the second emission area, a distance between the second emission area and the third emission area, and a distance between the first emission area and the third emission area, and a distance between the third emission area and the fourth emission area are equal in case that the sizes or areas of the first to fourth emission areas are equal and different in case that the sizes or areas of the first to fourth emission areas are different.

21. An electronic device including A display device, wherein the display device comprising:
 a display part that outputs display light for displaying an image;
 an optical part that forms a path of the display light so that the image is displayed on a transparent lens, and senses a change in an amount of light on the path of the display light caused by a user's touch to output light amount detection signals; and a controller that analyzes changes in magnitudes of the light amount detection signals to sense the user's touch, controls driving of the display part so that the sensing results on the user's touch is displayed on the image, and activates a user interface function based on sensing results.

* * * * *